(12) United States Patent
Andersson et al.

(10) Patent No.: US 12,031,324 B2
(45) Date of Patent: Jul. 9, 2024

(54) ROOM DIVIDER SYSTEM AND CONNECTOR FOR A ROOM DIVIDER SYSTEM

(71) Applicant: IKEA Supply AG, Pratteln (CH)

(72) Inventors: Benny Andersson, Almhult (SE); Mats Lundqvist, Lonsboda (SE)

(73) Assignee: IKEA Supply AG, Pratteln (CH)

( * ) Notice: Subject to any disclaimer, the term of this patent is extended or adjusted under 35 U.S.C. 154(b) by 177 days.

(21) Appl. No.: 17/292,058

(22) PCT Filed: Nov. 8, 2019

(86) PCT No.: PCT/SE2019/051130
§ 371 (c)(1),
(2) Date: May 7, 2021

(87) PCT Pub. No.: WO2020/094837
PCT Pub. Date: May 14, 2020

(65) Prior Publication Data
US 2021/0396007 A1  Dec. 23, 2021

(30) Foreign Application Priority Data

Nov. 9, 2018 (SE) .................................. 1851402-6
Dec. 20, 2018 (SE) .................................. 1851615-3

(51) Int. Cl.
*E04B 2/74* (2006.01)
*E04C 2/36* (2006.01)
*F16B 5/01* (2006.01)

(52) U.S. Cl.
CPC .............. *E04B 2/7425* (2013.01); *E04C 2/36* (2013.01); *F16B 5/01* (2013.01)

(58) Field of Classification Search
CPC .......... E04B 7/7425; E04B 2001/8452; E04B 2/7405; E04B 2/74; E04C 2/36; F16B 5/01
See application file for complete search history.

(56) References Cited

U.S. PATENT DOCUMENTS 3,605,851 A  9/1971  Miles et al.
4,084,367 A  4/1978  Saylor et al.
(Continued)

FOREIGN PATENT DOCUMENTS

CA   2161459 A1   4/1997
CN   201109952 Y  9/2008
(Continued)

OTHER PUBLICATIONS

Extended European Search Report for EP Application No. 19882966.5 mailed Jul. 8, 2022 (7 pages).
(Continued)

*Primary Examiner* — Andrew J Triggs
(74) *Attorney, Agent, or Firm* — Capitol City TechLaw

(57) ABSTRACT

A room divider system comprising at least one panel having a first sheet and a second sheet spaced apart by means of at least one lath, wherein said system further comprises a connector forming a rigid structure for associated equipment, said connector being configured to be at least partially inserted in a cavity formed between said first and second sheets, wherein the connector is arranged to be attached to the at least one lath.

22 Claims, 17 Drawing Sheets

(56) References Cited

U.S. PATENT DOCUMENTS

| | | | | |
|---|---|---|---|---|
| 4,089,614 | A | * | 5/1978 | Harley .................... F16B 12/16 403/231 |
| 4,121,645 | A | | 10/1978 | Behr |
| 4,310,995 | A | * | 1/1982 | Hanna ..................... E04C 2/384 52/204.597 |
| 4,448,231 | A | * | 5/1984 | Salkeld ................. E04B 2/7427 16/268 |
| 4,942,709 | A | | 7/1990 | Waldron |
| 4,989,688 | A | | 2/1991 | Nelson et al. |
| 5,134,826 | A | * | 8/1992 | La Roche ............. E04B 2/7437 52/584.1 |
| 5,187,908 | A | * | 2/1993 | Losensky .............. E04B 2/7425 52/582.1 |
| 5,256,020 | A | | 10/1993 | Ikeda |
| 5,560,413 | A | | 10/1996 | Brown |
| 6,088,908 | A | | 7/2000 | Gulliver |
| 6,088,980 | A | | 7/2000 | Gulliver |
| 6,141,926 | A | * | 11/2000 | Rossiter ................ E04B 2/7425 52/239 |
| 6,331,092 | B1 | | 12/2001 | Linger |
| 7,246,978 | B2 | * | 7/2007 | Morishima ............ A47B 13/06 411/116 |
| 8,201,362 | B2 | | 6/2012 | Alford et al. |
| 8,999,094 | B2 | * | 4/2015 | Pettersson ................. B32B 7/12 156/519 |
| 9,890,530 | B2 | * | 2/2018 | Tierney .................... B32B 3/04 |
| 10,253,496 | B2 | * | 4/2019 | Fleming, III ........... B32B 21/14 |
| 10,422,143 | B2 | | 9/2019 | Bevernage et al. |
| 11,247,438 | B2 | * | 2/2022 | Pettersson .............. B32B 21/14 |
| 2004/0237416 | A1 | | 12/2004 | Pitsch et al. |
| 2009/0094913 | A1 | | 4/2009 | Singh |
| 2010/0175328 | A1 | * | 7/2010 | Hess ..................... E06B 3/5892 49/404 |
| 2012/0216484 | A1 | | 8/2012 | Kago |
| 2013/0025220 | A1 | * | 1/2013 | Yu .......................... E04C 2/521 52/243 |
| 2013/0333839 | A1 | | 12/2013 | Pettersson et al. |
| 2013/0333939 | A1 | | 12/2013 | Pettersson et al. |
| 2014/0341644 | A1 | | 11/2014 | Maertens et al. |
| 2017/0182736 | A1 | | 6/2017 | Bergner et al. |
| 2017/0183869 | A1 | | 6/2017 | Berger |
| 2018/0142513 | A1 | | 5/2018 | Lampitelli et al. |

FOREIGN PATENT DOCUMENTS

| | | |
|---|---|---|
| CN | 101775945 A | 7/2010 |
| CN | 102257223 A | 11/2011 |
| CN | 103415390 A | 11/2013 |
| CN | 103987973 A | 8/2014 |
| CN | 106414862 A | 2/2017 |
| CN | 106461231 A | 2/2017 |
| CN | 106573452 A | 4/2017 |
| CN | 106639060 A | 5/2017 |
| CN | 108368703 A | 8/2018 |
| DE | 19712345 A1 | 9/1998 |
| EP | 3115521 A1 | 1/2017 |
| FR | 2351295 A1 | 12/1977 |
| FR | 101636544 A | 1/2010 |
| JP | H08326184 A | 12/1996 |
| JP | H11-280738 A | 10/1999 |
| JP | 2003138676 A | 5/2003 |
| JP | 2018079628 A | 5/2018 |
| KR | 20150055431 A | 5/2015 |
| WO | 2010006994 A1 | 1/2010 |
| WO | 2010/069994 A2 | 6/2010 |
| WO | 201060988 A1 | 6/2010 |
| WO | 2012048738 A1 | 4/2012 |
| WO | 2015/112080 A1 | 7/2015 |
| WO | 2020094837 A1 | 5/2020 |
| WO | 2020096521 A1 | 5/2020 |

OTHER PUBLICATIONS

Chinese Office Action for CN Application No. 201980081678.8 mailed Jul. 12, 2022 (21 pages, with English translation).
International Search Report for PCT/SE2019/051130 mailed Jan. 29, 2020 (4 pages).
International Search Report for PCT/SE2019/051131 mailed Jan. 29, 2020 (4 pages).
International Search Report for PCT/EP2019/080666 mailed Apr. 30, 2020 (7 pages).
Chinese Office Action for CN Application No. 201980081682.4 mailed Aug. 3, 2022 (18 pages, with English translation).
Chinese Office Action for CN Application No. 201980081683.9 mailed Aug. 3, 2022 (16 pages, with English translation).
Office Action dated Aug. 12, 2023 in the corresponding Chinese patent application No. 201980081678.8 (18 pages).

* cited by examiner

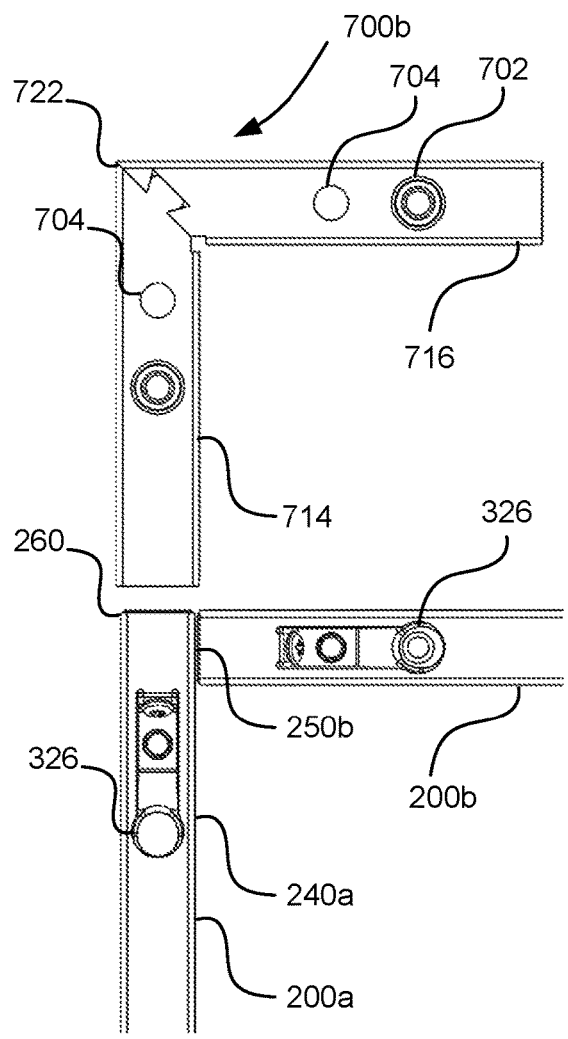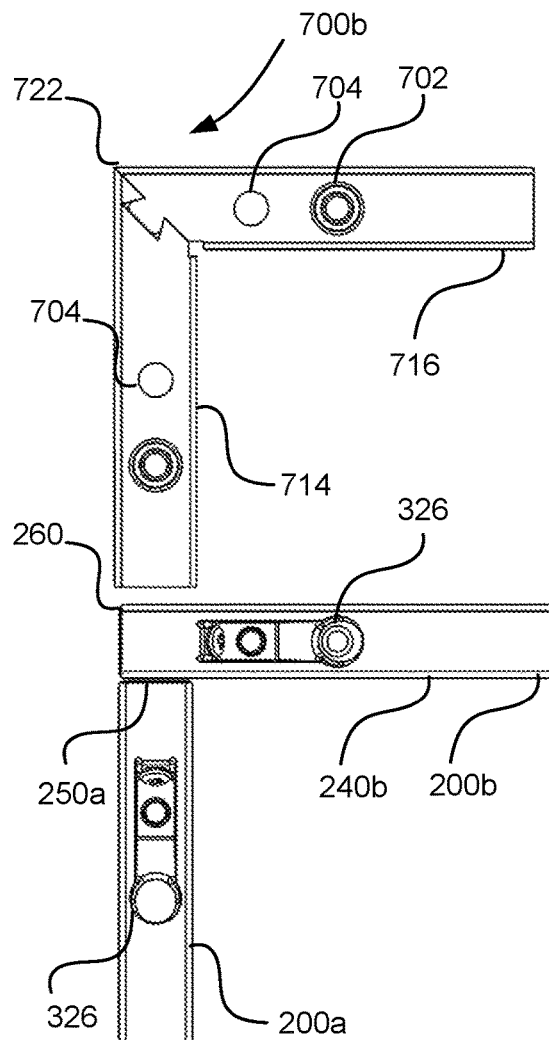
Fig. 5d　　　　　　　　Fig. 5e
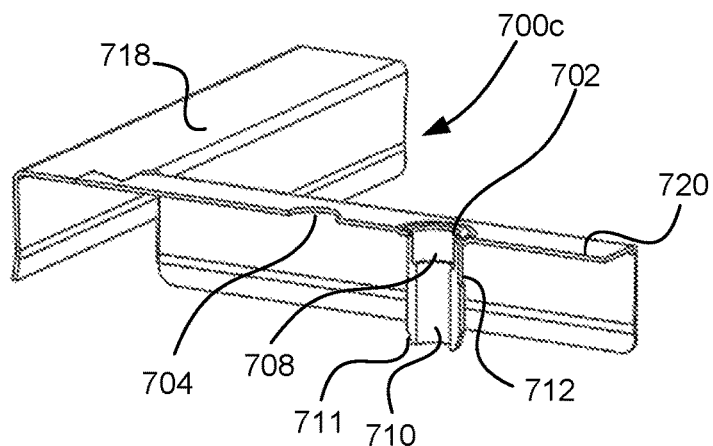
Fig. 5f

ROOM DIVIDER SYSTEM AND CONNECTOR FOR A ROOM DIVIDER SYSTEM

This application is a National Stage Application of PCT/SE2019/051130, filed 8 Nov. 2019, which claims benefit of Serial No. 1851402-6, filed 9 Nov. 2018 in Sweden and Serial No. 1851615-3, filed 20 Dec. 2018 filed in Sweden, and which applications are incorporated herein by reference. To the extent appropriate, a claim of priority is made to each of the above disclosed applications.

TECHNICAL FIELD

The present invention relates to the technical field of room dividers, and to interfaces for connecting room divider panels to other equipment.

BACKGROUND

Moveable walls, such as room dividers, are commonly used to make more efficient use of an area, such as a workplace or living space. An example of such a room divider is described in U.S. Pat. No. 4,310,995. They are becoming increasingly popular as the demand for flexible workplaces increase, as they allow adaptation depending on the purpose or number of workplaces etc. Such walls may of course be manufactured in numerous ways, but as the walls are to be moveable, they should preferably be of low weight. This should preferably be achieved while keeping a relatively high material strength, as to not compromise the structural integrity of the wall. Thus, divider panels typically comprise a metal or wood frame. Apart from structural integrity, the frame also provides for connection points in assembling panels into room dividers.

Manufacturers constantly strive to provide improved room dividers, and a step in that direction could be to produce walls out of lightweight materials other than wood or metal. However, such materials are often too weak to be able to be used, as they may give the panels properties that are negative in terms quality and durability. Furthermore, lightweight materials pose certain challenges, especially when it comes to using fasteners, such as screws, as these materials are generally less dense and more porous than for instance many wooden materials. Hence, it would be desirable to provide a room divider being made out of a lightweight material and which solves some of the problems with prior art.

SUMMARY

It is therefore an object of the invention to at least partly overcome one or more of the above-identified limitations of the prior art. In particular, it is an object to provide a room divider system facilitating the connection of equipment to a panel of the room divider system. Furthermore, it is an object to provide an interface, a connector and a washer which alleviates some of the problems with prior art.

In a first aspect, a room divider system comprising at least one panel with a first sheet and a second sheet spaced apart by means of at least one lath is provided. The system further comprises a connector forming a rigid structure for associated equipment, the connector being configured to be at least partially inserted in a cavity formed between said first and second sheets. Preferably, the connector is arranged to be attached to the at least one lath by means of a fastener, such as a screw. The connector distributes loads that the panel may be subjected to into the lath, improving the structural rigidity of the room divider system.

Further, in an embodiment, at least one connector may be attached to a sidewall and adjacent to a short side of the at least one lath. The connector may comprise a lip protruding essentially perpendicularly from a rear surface of the connector, the rear surface being configured to face the sidewall of the at least one lath, and the lip is configured to abut against the short side of the lath. The lip helps to distribute loads, especially such that are applied on the connector in the longitudinal direction of the lath, into the lath. As such, it relieves some of the loads that would otherwise be subjected to the fastener.

The connector may comprise a connection element for attachment of said associated equipment, the connection element facilitating connection of associated equipment to the connector and thus to the panel. The connector may comprise a main portion. The connection element may be implemented in a bottom wall of the main portion. An opening may be arranged opposite the bottom wall allowing access to the connection element. The connector may comprise a cavity for insertion of the connection element. In this way, the main portion of the connector can be formed by injection molding. The connection element can then be inserted into the cavity. The connection element may be a nut, any other type of connector, or simply a thread arranged in the bottom wall.

The connector may further comprise an inclined surface being configured to guide the fastener to attach to the at least one lath at an angle being larger than 0°, preferably larger than 45°, and preferably less than 90° in relation the longitudinal extension of the at least one lath, such as larger than 45° and up to 75°. Thereby a longer fastener may be used, allowing greater loads to be applied to the connector. Furthermore, the angle of the fastener facilitates connection thereof to the lath.

Furthermore, the room divider system may comprise at least one washer, and the connector may be attachable to said at least one lath by means of the fastener via a washer. The washer may be a separate entity, or it may be integrated in the inclined surface of the connector.

In one embodiment, the washer is configured to be arranged against the inclined surface, the washer further comprises a hole through which the fastener is receivable and which is configured to be aligned with an opening in the inclined surface. The washer further comprises at least one hill on the surface of the washer configured to face away from the inclined surface, and the at least one hill having a top which is arranged only on one side of a line parallel with the surface and extending through the center of the hole. The washer facilitates that the fastener is attached to the lath at a desired angle.

In an alternative embodiment, the washer is integrated in the inclined surface. According to such an embodiment, at least one hill is arranged on the surface of the inclined surface. The at least one hill has a top which is arranged only on one side of a line A parallel with the surface and extending through the center of an opening in the inclined surface. Similar to the separate washer, also an integrated washer facilitates that the fastener is attached to the lath at a desired angle.

The washer may be arranged such that the line A is essentially parallel with the bottom wall and such that the top of the at least one hill is arranged on the side of the washer defined by the line being closest to a bottom wall of the connector. The at least one hill is thereby arranged such that it will provide a force on the fastener which serves to maintain the desired angle between the fastener and the lath.

In one embodiment, a plurality of distance members is arranged between the first sheet and the second sheet, the plurality of distance members being connected to the first sheet and to the second sheet, respectively.

The sheets may be sheets comprising lignocellulosic fibers. Thus, the sheets may be sheets of a particle board, fiber board, MDF board, HDF board, or paper board. Especially, the sheets may be paper sheets, such as paperboard sheets. Further, the sheets may be a laminate comprising paper sheet(s) as well as other layers, e.g. metal foil and/or plastic film. As recognized by the skilled person, paper is a thin material produced by pressing together moist fibers of cellulose pulp derived from wood, rags or grasses, and drying them into flexible sheets. The cellulose pulp is typically derived from wood. Paper is typically far more flexible than other fiber boards comprising lignocellulosic fibers. For continuous production of the room divider panel it is preferred if the sheets are flexible. The sheets may be 0.1 to 5 mm thick, such as 0.3 to 3 mm thick, or 0.5 to 2 mm thick.

According to an embodiment, the sheets are paperboard sheets comprising re-cycled paper. In re-cycled paperboard, the length of the lignocellulosic fibers are typically shorter than in virgin paperboard. Shorter fiber length will provide a more flexible, less stiff material with lower mechanical resistance. In the present application this may actually be preferred, as a hollow board material with sheets of re-cycled paperboard will be far less prone to buckle compared to a hollow board material with sheets of another fiber board material. Paperboard sheets, such as paperboard sheets comprising re-cycled paper, may have a surface weight of 200 to 800 $g/m^2$, such as 400 to 700 $g/m^2$.

A first and a second lath, each optionally comprising a plurality of strips arranged on top of each other, are arranged in parallel between the first sheet and the second sheet along opposite edges of the panel. The first and second lath are connected to the first sheet and to the second sheet, respectively, thereby providing a hollow board material and at least one of the first and the second sheet, at the outer surface, is coated with a fabric. The fabric serves to provide a more aesthetic appearance. Further, the fabric is sound dampening. Typically, both the first and the second sheets are coated with a fabric at their outer surfaces. The panel may, as mentioned, comprise a hollow board material with a first sheet and a second sheet. The sheets may be paper sheets, such as paperboard sheets.

The distance members serve to separate the first sheet and the second sheet, being arranged in parallel. Further, the distance members make the hollow board material more rigid and less compressible.

The first and second laths may be laths of a particle board, fiber board, MDF board, HDF board, or paper board. Especially, the first and second laths may be laths of paper board. Each of the laths are preferably multilayered and comprises a plurality of strips arranged on top of each other. The strips may be paper strips, such as paperboard strips. By arranging the laths along opposite edges of sheets, a hollow board material is provided. According to an embodiment, the strips in a multilayered lath are arranged perpendicular to the longitudinal extension of the first and second sheets.

When assembled into a room divider, the laths are typically positioned vertically. In contrast to room divider panels in the art, the present panel does typically not comprise any full frame, e.g. no laths are arranged perpendicular to the first and a second lath at the edges of the hollow board material. This means that the end consumer, e.g. by cutting the panel, easily may adjust the length of the panel. Further, there is no need to reassemble a frame once the panel has been shortened. As the sheets, the distance members and the laths typically all are made of paper, the panel may by shortened by cutting with e.g. a simple knife or saw. This implies that the end consumer is provided with a truly flexible room divider panel.

Hollow board material of this type is known in the art (cf. WO 2012/048738). As described in WO 2010/069994 (referred to in WO 2012/048738), the present hollow board material has been disclosed as a board material for manufacturing of furniture, e.g. bookshelves, shelves, and tables. It has however been considered and confirmed that such hollow board material may be used as board material in room dividers panels, if coated with a fabric. Even though the laths are multilayered and comprises a plurality of paper strips arranged on top of each other, they still have sufficient strength for securing a fastener, e.g. a screw, to be screwed into them. Thus, a connector may be attached to an end of the lath, e.g. by means of a screw. Alternatively, but less preferred, the connector may be attached to an end of the lath by an adhesive and/or by ultrasonic welding. It is however preferred if the connector may be removed and re-connected, e.g. after having shortened the panel by cutting. The connector allows for mounting the panel as part of a room divider. Further, as the connector may be attached to the panel in a simple manner, e.g. by screwing, it may be mounted to the panel, once the panel has been cut into the desired length, by the end-consumer. Further, the connector may not only be attached to the end of the lath, but also to the first sheet and/or the second sheet. This may serve to provide a stronger attachment of the connector. This may be beneficial, especially in embodiments wherein the connector not is attached to the lath by means of a screw. The attachment of the connector to the first sheet and/or the second sheet may be by means of an adhesive and/or by ultrasonic welding.

The connector may comprise a main portion having an essentially cuboid shape, an opening being arranged opposite the bottom wall allowing access to the fastener and to the connection element. The connector may comprise a receiving portion comprising a sleeve portion configured to engage with a notch of an attachment element of an attachment member that is to be attached to the connector. A bottom edge of the sleeve portion may engage with a notch of the attachment element. The receiving portion may be attached to and extend from a sidewall of the main portion. The receiving portion may further comprise a receiving portion comprising a hole configured to receive the attachment element. The hole may be substantially elliptical in cross-section, in order to provide some tolerance for the alignment and insertion of the attachment member. A retaining force may be provided between the attachment element and the receiving portion when the attachment element is attached to the receiving portion. This holds the attachment member in place. The connection between the attachment element and the receiving portion is further held in place by the engagement of the notch with the sleeve portion. This provides an additional or alternative means for connecting an attachment member to the panels to which it is attached.

In one embodiment, the room divider system further comprises a profile being configured to be arranged covering a top and/or a bottom edge of the panel, the profile having a flange configured to be attached by means of the fastener to the connector and to the lath. The profile covers the opening into the space between the sheets of the panel, protects the top and bottom edges as well as provides additional possibilities to attach equipment/items to the room divider system. Thus, the profile may serve as a trim piece.

The profile preferably comprises at least one opening allowing access to the connection element and to the fastener. In one embodiment, the flange of the profile is configured to be arranged between the washer and the inclined surface.

Further, the room divider system may comprise at least two panels. The panels may be attached to each other by means of an attachment member. The attachment member may be connected to two profiles present at two adjacent panels. The attachment member may be a U-profile with a hole, through which a fastening element, e.g. screw, may be received. The fastening element may be connected to the connection element, e.g. a nut, of the connector.

Further still, at least one connector may be arranged adjacent to a short end of a at least one lath of the panel. Optionally, a respective connector is preferably arranged adjacent to each of at least two corners of the panel, such as a respective connector arranged in each of the four corners of the panel, providing connection points along the top and bottom edges of the panel.

In one embodiment, each connector that is configured to be arranged along a bottom edge and/or a top edge of the panel comprises a supporting bar configured to extend in the longitudinal direction of the lath between the first and second sheets of the panel. The connectors along the bottom edge of the panel are subjected to higher/different loads and the bar will help transfer these loads to the panel and increase the stability of the room divider system.

The supporting bar may further be arranged on the connector such that it extends adjacent to the lath in an abutting manner when the connector is attached to the lath. The bar will thus form a support against the lath, further improving the stability of the connector.

The supporting bar may be tapered along its extension. This taper allows the connector to be inserted in the cavity that is formed between the first and second sheets of the panel and alongside the sidewall of the lath without compressing distance members of the panel. By providing a taper, the connector can be inserted between the first and second sheets more smoothly.

The supporting bar may also comprise a number of slats. This gives the supporting bar sufficient structural integrity, whilst also reducing material requirements and the overall weight of the connector.

In one embodiment, the associated equipment comprises at least one of an attachment member, an adjustable foot, or a suspension member for assembling the panel as a sliding door.

In a second aspect a connector is provided for use with a room divider system of the first aspect, the connector facilitating connection of associated equipment to a panel of the room divider system. Features of the connector have already been described herein above.

In a third aspect an interface is provided for use with a room divider system according to the first aspect, the interface comprising a connector according to the second aspect attachable to a lath by means of a fastener. The interface facilitates connection of associated equipment to a panel of a room divider system.

The interface may further comprise a profile, the profile also being attachable to the connector and the panel by means of the fastener. The profile provides protection to the edges of a panel to which the interface is attached, and allows more attachment points for attaching for instance supports and/or adjustment feet to the panel.

In one embodiment, the interface further comprises a washer according to the third aspect.

The present room divider system may be assembled in various forms in order to provide a divided room. The room divider system may take various forms in such use. It may be used in offices, public spaces, such as schools, restaurants and shops, as well as in homes. In some applications, panels of the room divider system are arranged to extend from floor to ceiling, whereas in others they do not extend to the ceiling. Further, the room divider system may be assembled with a room divider panel as a sliding door, e.g. in a wardrobe, wherein the panel, arranged as a sliding door, serves to provide access to a space divided from the rest of the room by the room divider system.

Further advantageous features of the invention are elaborated in embodiments disclosed herein. In addition, advantageous features of the invention are defined in the dependent claims.

BRIEF DESCRIPTION OF THE DRAWINGS

The present invention will be described further below by way of example and with reference to the enclosed drawings. In the drawings:

FIG. 5d is a plan view of an L-shaped attachment member according to one embodiment, FIG. 5e is a plan view of an L-shaped attachment member according to one embodiment, FIG. 5f is a cross-section view of a T-shaped attachment member according to one embodiment.

DETAILED DESCRIPTION OF EMBODIMENTS

Figure 1A:
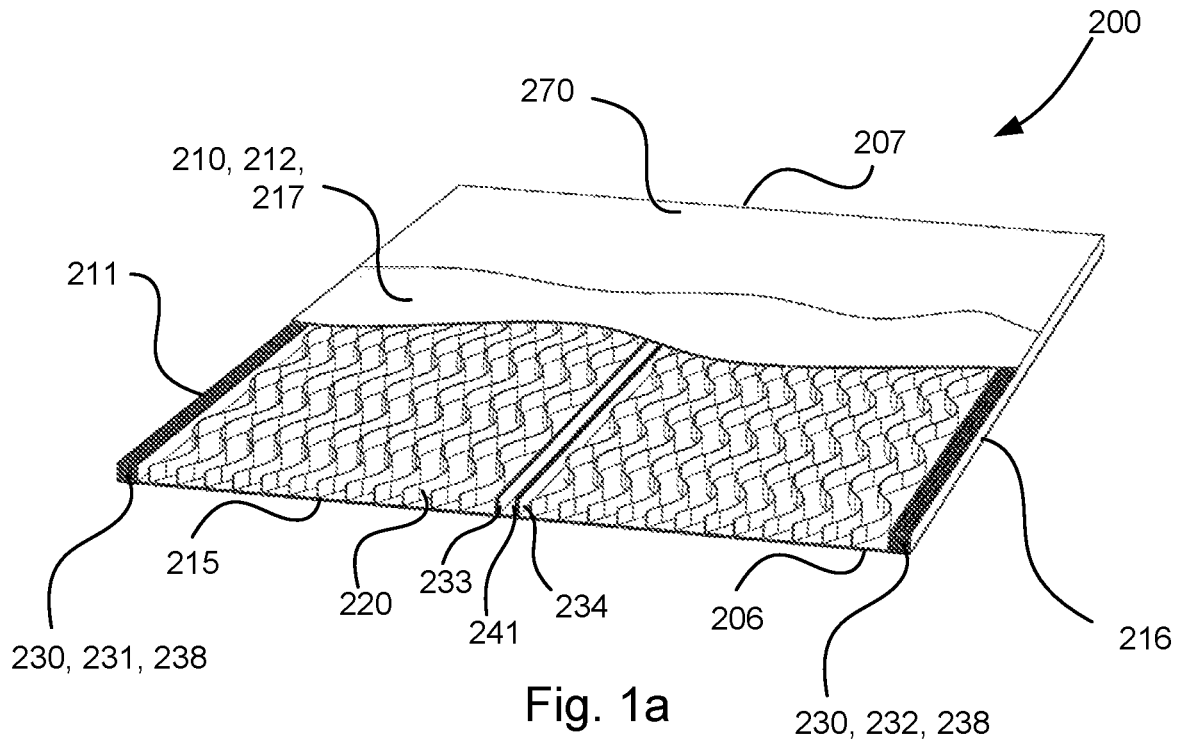
FIG. 1a is a perspective view of a panel for a room divider system.

FIGS. 1 and 2 show a room divider panel 200, and parts thereof (FIG. 2), for a room divider system 100 according to an embodiment. The panel 200 preferably comprises a hollow board material. The hollow board material comprises two parallel sheets 210, 215. The sheets 210, 215 may comprise lignocellulose fibers. Thus, the sheets may be sheets of a particle board, fiber board, MDF board, HDF board, or paper board. Especially, the sheets may be paper sheets, such as paperboard sheets. Paperboard sheets may have a surface weight of 200 to 800 g/m², such as 400 to 700 g/m². Further, the sheets may be a laminate comprising paper sheet(s) as well as other layers, e.g. metal foil and/or plastic film. As recognized by the skilled person, paper is a thin material produced by pressing together moist fibers of cellulose pulp derived from wood, rags or grasses, and drying them into flexible sheets. The cellulose pulp is typically derived from wood. Paper is typically far more flexible than other fiber boards comprising lignocellulosic fibers. For continuous production of the room divider panel it is preferred if the sheets are flexible. The sheets may be 0.1 to 5 mm thick, such as 0.3 to 3 mm thick or 0.5 to 2 mm thick. The first sheet 210 and the second sheet 215 are separated by a plurality of distance members 220 arranged between the first sheet 210 and the second sheet 220. The distance members 220 are connected to the first sheet 210 and to the second sheet 215. The distance members 220 may be connected to the first sheet 210 and the second 215 sheet by means of an adhesive, such as a melt glue. The distance members 220 consists of paper strips meandering between the two parallel sheets 210, 215, perpendicular to the extension of the parallel sheets 210, 215. In order to provide a rigid panel and to allow for attachment of a connector 300, laths 230 are arranged between the first sheet 210 and the second sheet 215. The laths 230 comprises a plurality of strips 238 arranged on top of each other. The strips 238 are typically attached to each other by means of an adhesive to form a solid lath 230, comprising a multilayer of strips 238. The strips are paper strips. The laths 230 are arranged such that the strips 238 are arranged perpendicular to the extension of the parallel sheets 210, 215. At their outer surfaces 212, the first sheet 210 and the second sheet 215, are coated with a fabric 270.

Figure 2A:
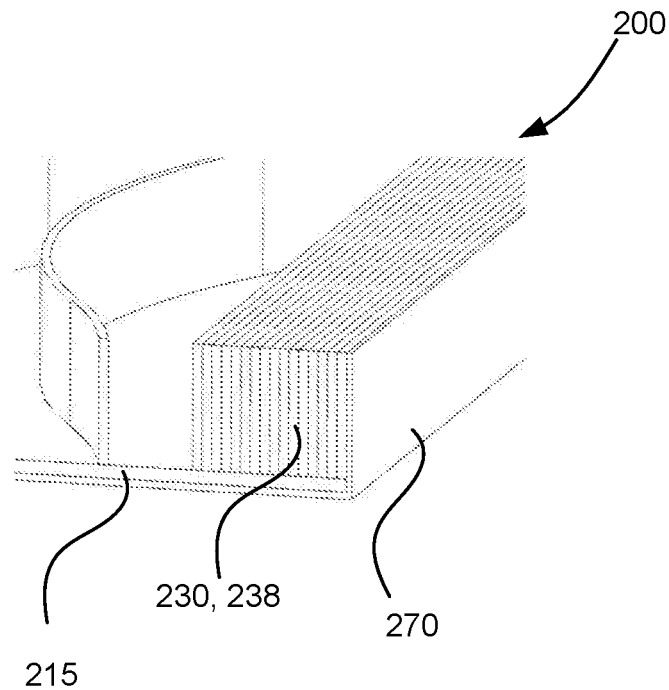
FIG. 2a is a detail view of a lath of a panel for a room divider system.
Figure 2B:
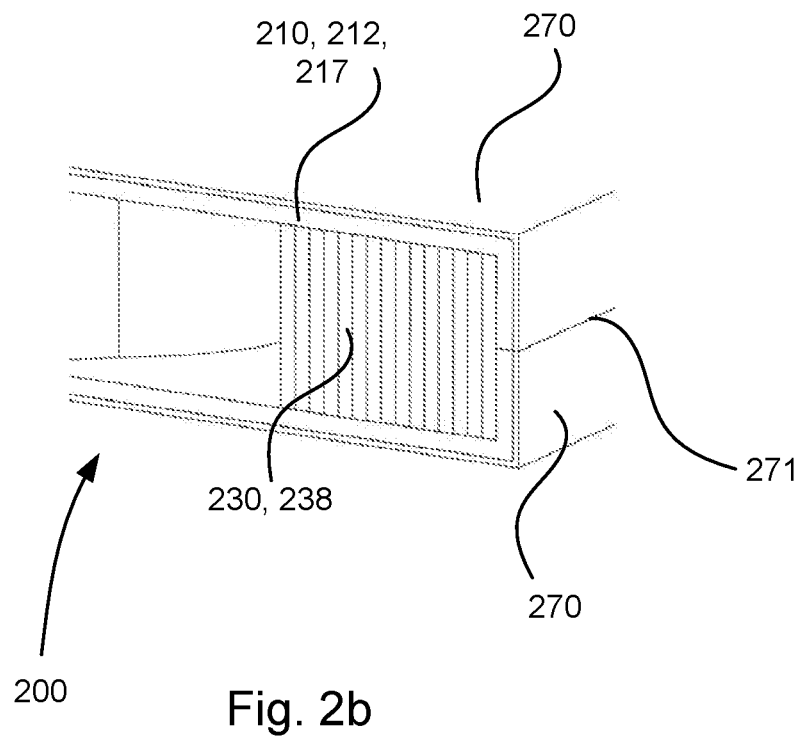
FIG. 2b is a detail view of a lath of a panel for a room divider system according to another embodiment.

In the embodiment shown in FIG. 1a, the panel comprises a first 231 and a second lath 232. The first lath 231 and the second lath 232 are arranged in parallel between the first sheet 210 and the second sheet 215. Further, they are connected to the first sheet 210 and the second 215 sheet by means of an adhesive, such as a melt glue. The first lath 231 and the second lath 232 are arranged along opposite edges 211, 216 of the hollow board material. As can be seen in FIGS. 2a and 2b, the fabric 270 may be folded over the first lath 231. Similarly, the fabric 270 may be folded over the second lath 238 at the opposite edge of the hollow board material. Further, also the first sheet 210 and/or the second sheet 215 may be folded over the first lath 231. Similarly, the first sheet 210 and/or the second sheet 215 may be folded over the second lath 232. A splice 271 may be arranged along the edge of the edge of the hollow board material as shown in FIG. 2b. The splice 271 may also be arranged on the outer surfaces 212, of the first sheet 210 and/or the second sheet 215. If arranged on the outer surfaces 212, of the first sheet 210 and/or the second sheet 215, the splice 271 may be arranged over the first lath 231 or the second lath 231.

Figure 3A:
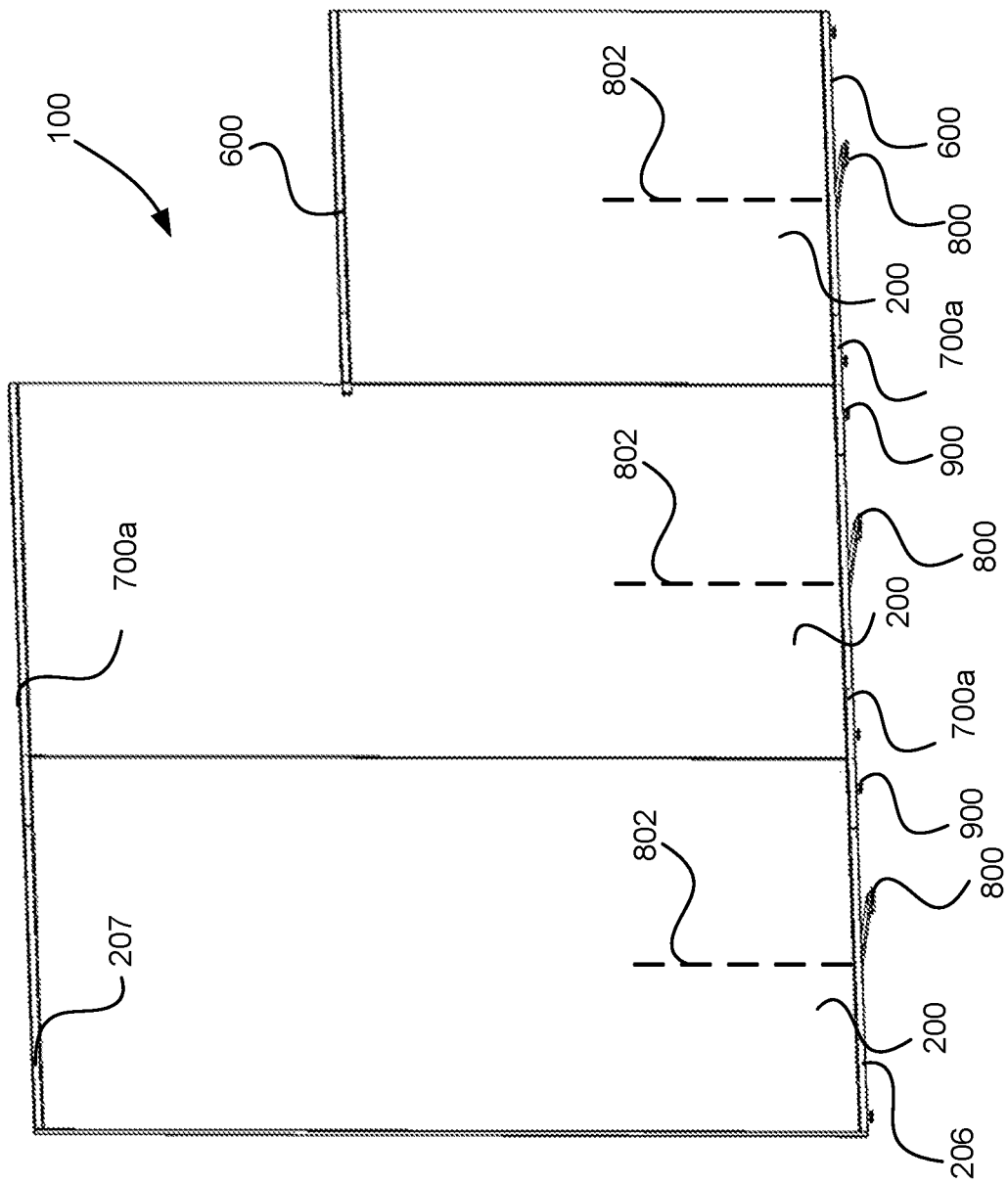
FIG. 3a is a perspective view of a room divider system comprising a number of panels.

In the embodiment shown in FIG. 1a, the panel further comprises a third lath 233 and a fourth lath 234. The third and fourth lath 233, 234 are arranged in parallel between the first and the second sheet 210, 215. Further, they are connected to the first sheet 210 and the second 215 sheet by means of an adhesive, such as a melt glue. The third 233 and fourth lath 234, together with the first sheet 210 and the second sheet 215, form a first channel 241 between them. As shown in FIG. 3a, the first channel 241 may receive a support 800.

Figure 1B:
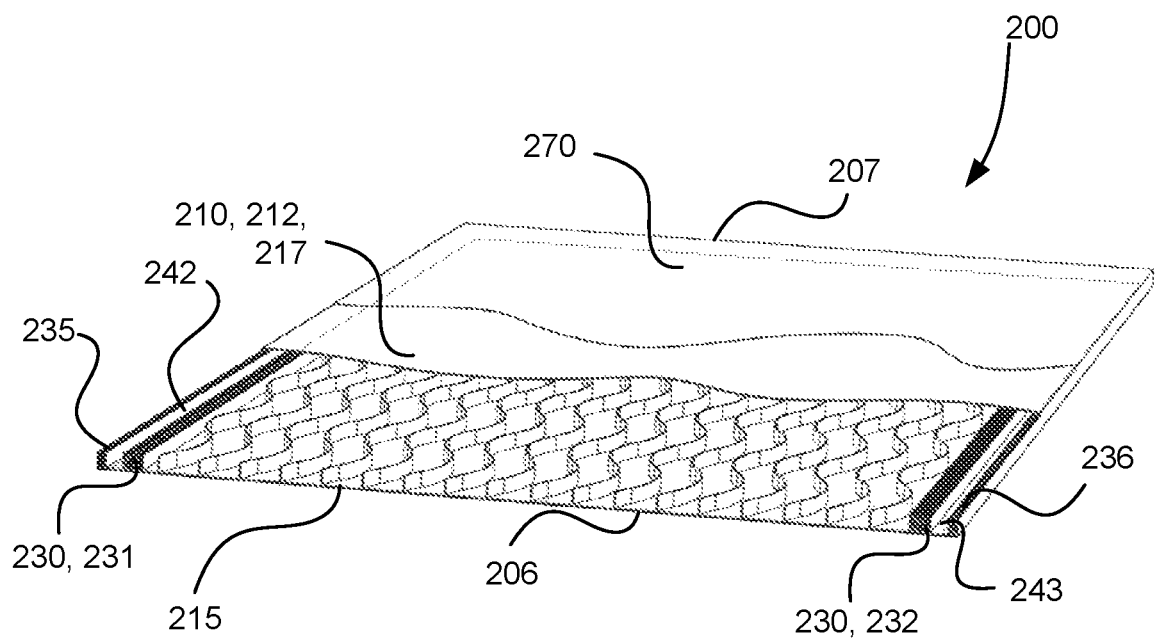
FIG. 1b is a perspective view of a panel for a room divider system according to an alternative embodiment.

According to another embodiment, shown in FIG. 1b, the panel further comprises a fifth lath 235. The fifth lath 235 is arranged in between the first sheet 210 and the second sheet 215. Further, the fifth lath 235 is arranged in parallel with the first lath 231. The fifth lath 235 is connected to the first sheet 210 and the second 215 sheet by means of an adhesive, such as a melt glue. The fifth lath 235 and first lath 231, together with the first sheet 210 and the second sheet 215, form a second channel 242 between them. Further, the panel comprises a sixth lath 236. The sixth lath 236 is arranged in between the first sheet 210 and the second sheet 215. Further, the sixth lath 236 is arranged in parallel with the second lath 232. The sixth lath 236 is connected to the first sheet 210 and the second 215 sheet by means of an adhesive, such as a melt glue. The sixth lath 236 and second lath 232, together with the first sheet 210 and the second sheet 215, form a third channel 243 between them.

Figure 3C:
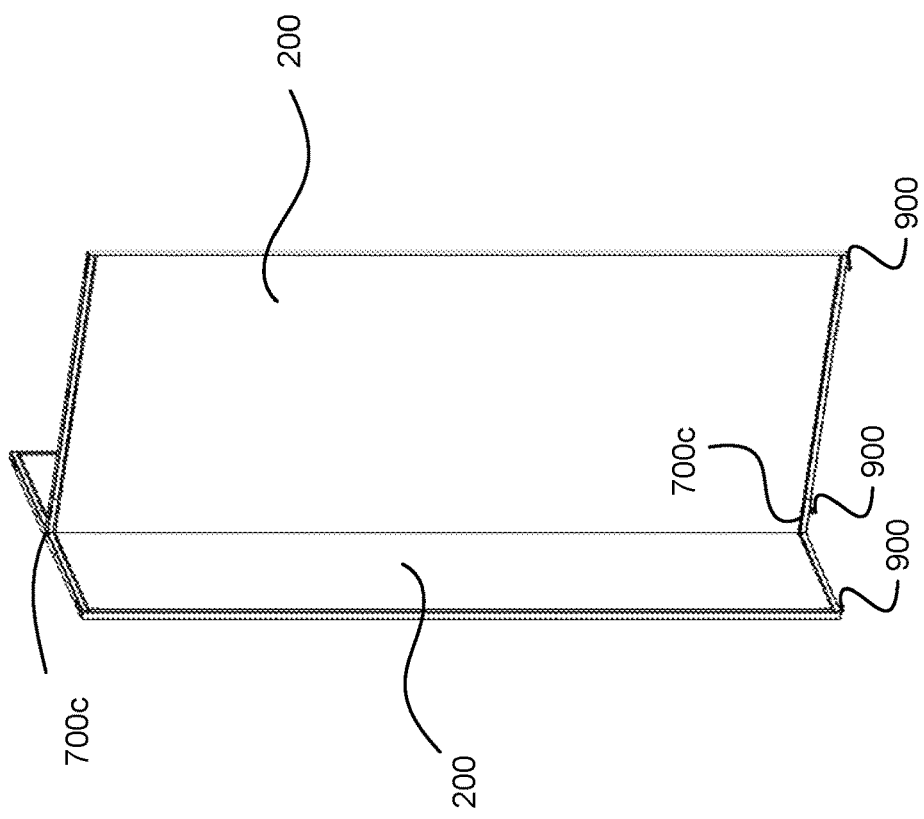
FIG. 3c is a perspective view of a room divider system comprising a number of panels according to another embodiment.
Figure 3B:
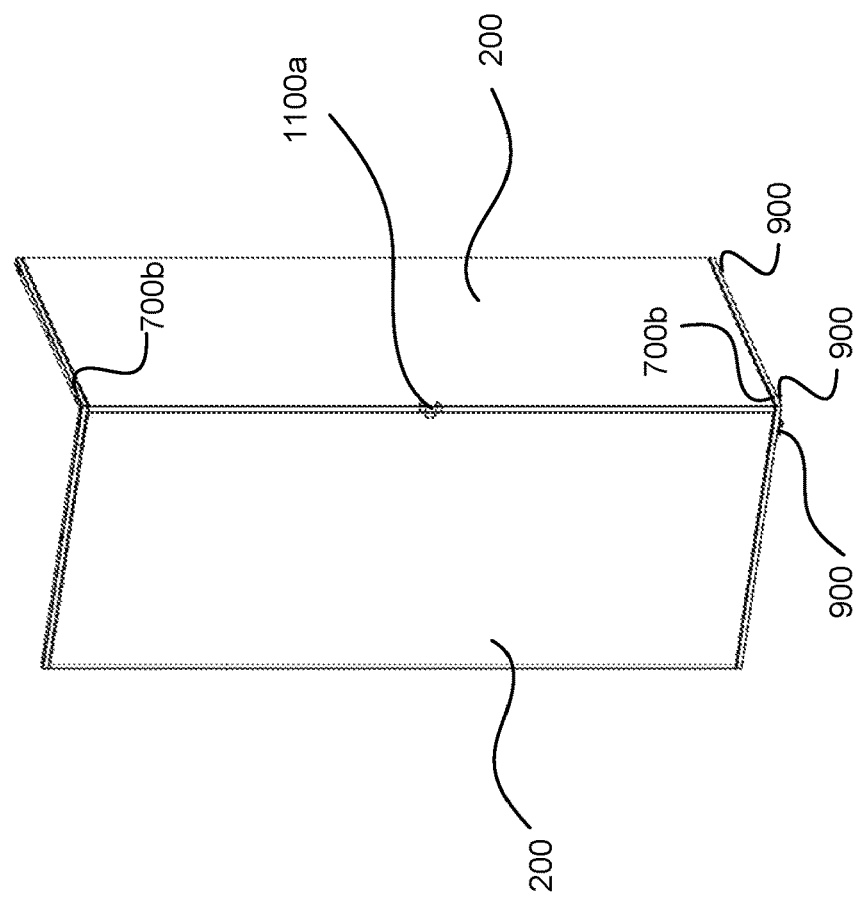
FIG. 3b is a perspective view of a room divider system comprising a number of panels according to another embodiment.

As is shown in FIGS. 3a-c, a number of panels 200 may be assembled into a room divider system 100. In FIG. 3a, three panels 200 are shown assembled adjacently. It is to be understood that any number of panels 200 could be connected to each other, both fewer and more than three. The panels 200 are kept in upright position by supports 800, which can be seen in detail in FIG. 4a. Further, adjustable feet 900, which can be seen in detail in FIG. 4b, are provided on the lower end to provide stability and adjustability to the surface on which the room divider system 100 rests. The adjustable feet 900 may be conventional threaded feet, which are connected to each panel such that rotation of each foot 900 changes its protrusion from underside of the panel 200.

Figure 5A:
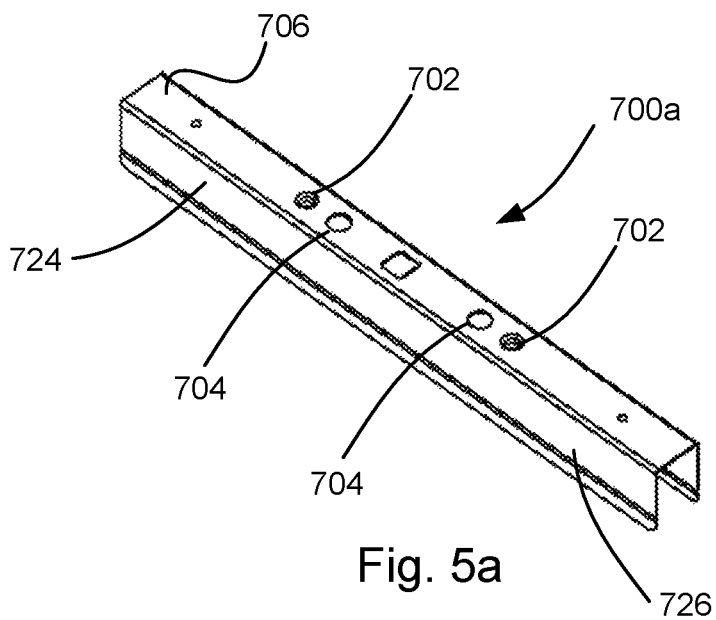
FIG. 5a shows a perspective view of an elongate attachment member according to one embodiment.
Figure 5B:
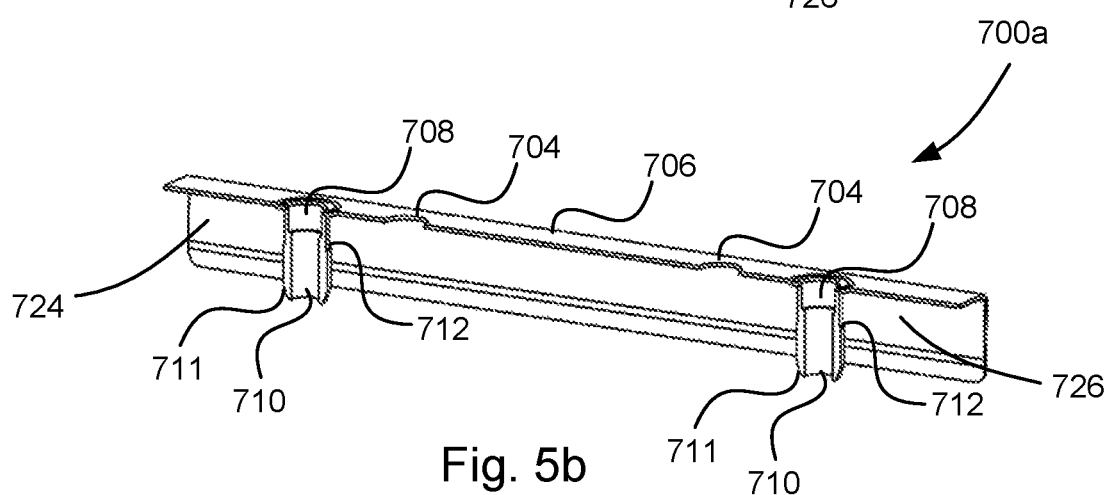
FIG. 5b shows a cross-section view of an elongate attachment member according to one embodiment.

As shown in FIG. 3a, the individual panels 200 are connected to each other via attachment members 700a, which can be seen in detail in FIGS. 5a and 5b respectively, attached to the connectors 300. The attachment members 700a may be placed over assembled panels, holding the panels together and covering any gap between adjacent panels. As will be discussed below, the attachment members 700a may have attachment elements 708 that connect to the connectors 300 and generate a force on the connectors 300, holding the panels together. As discussed in relation to FIGS. 2a and 2b, fabric 270 may be folded over the edge of each panel. When the panels are pushed together edge-to-edge, as shown in FIG. 3a, the fabric on the edge of each panel may compress and be held in this compressed position by a retention force provided by the attachment members 700a. This ensures that there is no visible spacing between adjacently assembled panels. Further, by pushing the panels together sound is essentially prevented from passing between them, as the gap has been closed. Thus, the noise-cancelling effect of panels assembled as room divider system is improved. This is advantageous in e.g. open office areas sectioned off into working stations by a room divider system.

As is shown in FIG. 3b, a number of panels 200 may alternatively be assembled in an L-shape. The individual panels 200 are connected to each other via attachment members 700b, which can be seen in detail in FIG. 5c, attached to the connectors 300.

Figure 16A:
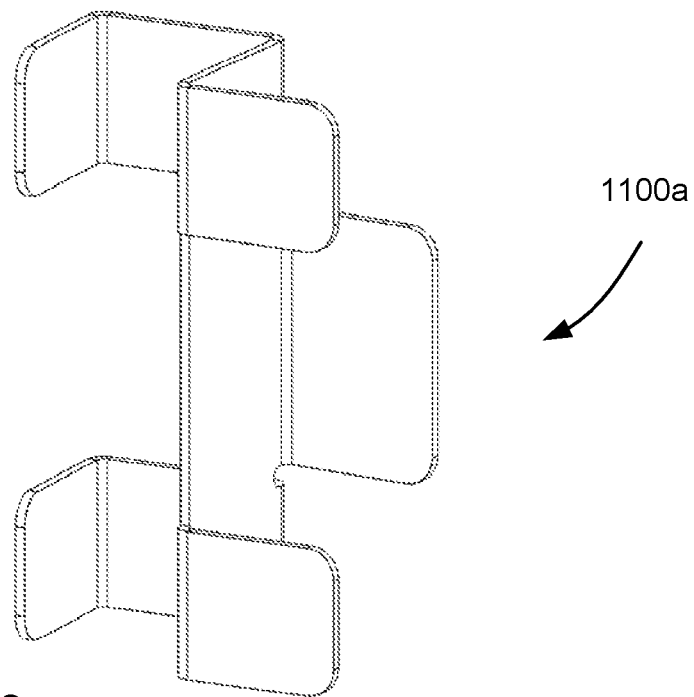
FIG. 16a shows an L-shaped assembly support according to one embodiment.

Similarly to the arrangement shown in FIG. 3a, the attachment members 700b may be placed over assembled panels, holding the panels together and covering any gap between adjacent panels. The attachment members 700b may have attachment elements 708 that connect to the connectors 300 and generate a force on the connectors 300, holding the panels together. When the panels are pushed together the fabric on each panel may compress and be held in this compressed position by the retention force provided by the attachment members 700b. In this case, the retention force would be carried by the attachment elements 708 and the walls of a U-shaped part of the attachment members 700b. Further, adjustable feet 900 are provided on the lower end to provide stability and adjustability to the surface on which the room divider system 100 rests, as disclosed in relation to FIG. 3a. Also shown in FIG. 3b is an assembly support 1100a (FIG. 16a shows a close up of the support 1100a). The assembly support 1100a has two U-profile like portions arranged perpendicularly to each other, i.e. the assembly support 1100a is L-shaped. The assembly support 1100a is used to secure, i.e. keep in position, a first panel 200a during assembling panels 200 into a room divider system 100. Once the first panel 200a has been placed next to a second panel 200b on an attachment member 700b next to the floor, the assembly support 1100a prevents the first panel 200a from falling over before being secured by an upper attachment member 700b, as the first U-profile like portion engages with the first panel 200a and the second U-profile like portion engages with the second panel 200b.

As is shown in FIG. 3c, a number of panels 200 may also be assembled in a T-shape. In some embodiments, two panels 200 may be assembled perpendicularly, such that a first panel is assembled with an edge adjacent a central part of a second panel. In other embodiments, three panels 200 may be assembled such that first and second panels are assembled adjacently, similar to the panels shown in FIG. 3a, and a third panel is assembled perpendicularly to the first and second panels, with an edge adjacent the interface between the first and second panels. The individual panels 200 are connected to each other via attachment members 700c, which can be seen in detail in FIG. 5d, attached to the connectors 300. Similarly to the arrangements shown in FIGS. 3a and 3b, the attachment members 700c may be placed over assembled panels, holding the panels together and covering any gap between adjacent panels. The attachment members 700c may have attachment elements 708 that connect to connectors 300 and generate a force on the connectors 300, holding the panels together. When the panels are pushed together the fabric on each panel may compress and be held in this compressed position by the retention force provided by the attachment members 700c. In the case that a first panel is assembled with an edge adjacent a central part of a second panel, the retention force would be carried by an attachment element of a first portion of the attachment member 700c, and a wall of a U-shaped part of a second portion of the attachment member 700c. In the case that three panels are assembled with first and second panels assembled adjacently and a third panel assembled perpendicularly with an edge adjacent the interface between the first and second panels, the retention force would be carried by an attachment element of each leg of the attachment member 700c. Further, adjustable feet 900 are provided on the lower end to provide stability and adjustability to the surface on which the room divider system 100 rests, as disclosed in relation to FIG. 3a.

Figure 4A:
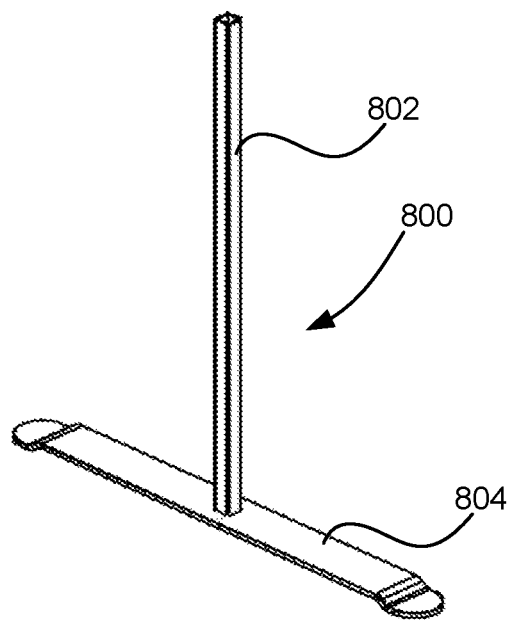
FIG. 4a is a perspective view of a support for connection to the room divider system.
Figure 4B:
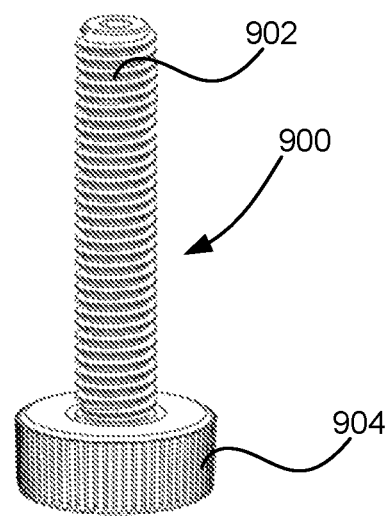
FIG. 4b is a perspective view of an adjustable foot for connection to the room divider system.

FIG. 4a shows a support 800 according to an embodiment. The support 800 has a rod 802 received in the first channel 241. Further, the support 800 has a foot 804 extending perpendicular to the extension of the rod 802 and perpendicular to the extension of the first sheet 210 and the second sheet 215 supporting the panel 200 in an upright position. The foot 804 can be provided with adjustable feet (not shown) in order to level out any unevenness in the floor, resulting in a vertically leveled position of the panel. For example, an adjustable foot 900, as described in relation to FIG. 4b, can be screwed into a corresponding portion of the foot 804.

FIG. 4b shows an adjustable foot 900 according to an embodiment. The adjustable foot 900 has a threaded rod 902 configured to be received in a corresponding part of a connector 300, profile 600 or attachment member 700 of the room divider system 100. The threaded rod 902 is configured such that rotation of each foot 900 changes its protrusion from underside of the panel 200. Further, the adjustable foot 900 has a foot 904 configured to support the panel 200 in an upright position.

Referring to FIG. 5a, a first embodiment of an attachment member 700 is shown. The attachment member 700a comprises a substantially elongate member having a generally U-shaped cross-section extending continuously along an axis. This allows the attachment member 700a to be placed over adjacently assembled panels, as shown in FIG. 3a, holding the panels together and covering the gap between adjacent panels. A first end 724 of the attachment member 700a is positioned to fit over a first panel. A second end 726 of the attachment member 700a is positioned to fit over a second panel. Thereby increased stability is provided to the connection between the two panels. The generally U-shaped cross-section of the attachment member 700a allows it to be configured to exert a clamping force on a respective panel when fit over the panel. The attachment member 700a may be elastically deformable, such that it can be deformed to fit over adjacently assembled panels, and then as it retakes its original form, it provides a clamping force on the panels in order to provide a secure connection. In some embodiments, the attachment member 700a is configured to be connectable to the top of the first and second panels by a snap-fit provided by the U-shaped cross-section of the attachment member 700a.

The attachment member 700a comprises a number of threaded portions 702 formed in the top surface 706 of the attachment member 700a. The threaded portions 702 may allow the attachment of an additional element comprising a corresponding thread that can be screwed into a threaded portion 702. An additional element may be, for example, an adjustable foot 900, or a suspension member 1200 as disclosed in relation to FIGS. 14a and 14b.

The attachment member 700a also comprises a number of holes 704 formed through its top surface 706. The holes 704 provide a gap for insertion of a fastening element (not shown). The fastening element can be connected to a connection element 304 of a connector 300 to fasten the attachment member 700a in place, as will be explained in relation to FIGS. 6 and 7. The holes 704 may alternatively provide a gap for insertion of an additional element that can be connected to a connection element 304 of a connector 300, for example, an adjustable foot 900, or a suspension member 1200.

The attachment member 700a additionally comprises a number of attachment elements 708 (not shown in FIG. 5a) configured to be inserted into a corresponding part of a connector 300. The structure and function of the attachment elements 708 will be described in more detail in relation to FIG. 5b. In some embodiments, the attachment member 700a comprises a threaded portion 702, a hole 704 and an attachment element 708 corresponding to each panel to which it will be attached. However, it will be appreciated that any combination of threaded portions 702, holes 704 and attachment elements 708 that enable a suitable function of the attachment member 700a may be implemented.

Figure 11A:
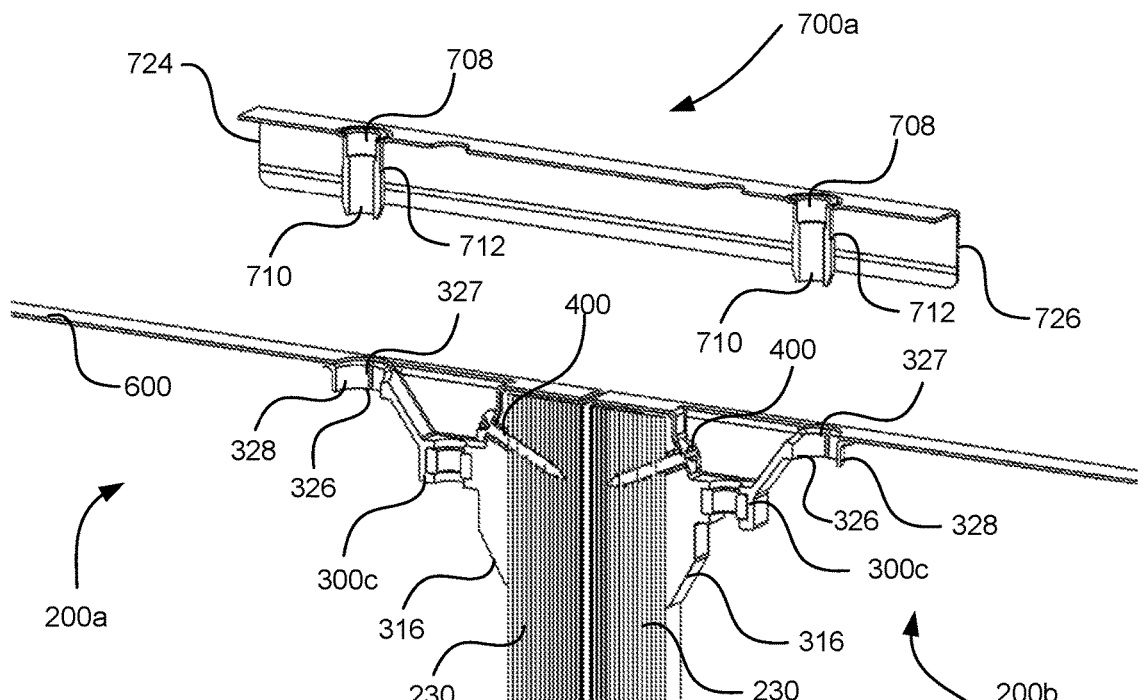
FIG. 11a is an exploded cross-section view of a room divider system comprising an elongate attachment member according to one embodiment.
Figure 11B:
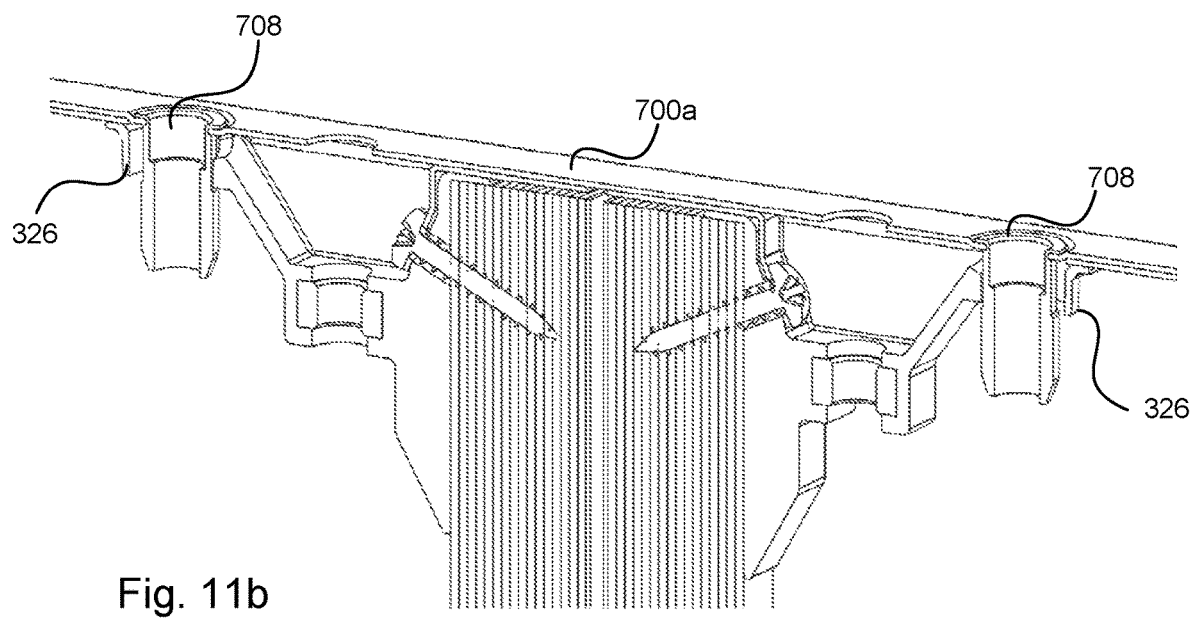
FIG. 11b is a perspective cross-section view of a room divider system comprising an elongate attachment member according to one embodiment.

Referring to FIG. 5b, an attachment member 700a is shown in cross-section. As discussed above, the attachment member 700a comprises a number of attachment elements 708. The attachment elements 708 are configured to be inserted into a receiving portion associated with a respective panel, as will be discussed below. The receiving portion may be a connector receiving portion associated with a connector 300, or a profile receiving portion associated with a profile 600. The attachment elements 708 each comprise a generally cylindrical portion 710 that extends away from a top surface 706 of the attachment element 700a. In some embodiments, the generally cylindrical portion 710 may be open around at least part of its circumference, such that is has a half-pipe-like form. In some embodiments, the end of the attachment element 708 that is furthest from the top surface 706 of the attachment member 700a comprises a generally conical portion 711, to enable easier insertion into the receiving portion. The attachment elements 708 are configured to exert a retaining force on the receiving portion when inserted. This is achieved by a snap fit between the attachment element 708 and the receiving portion. The receiving portion may be configured to elastically deform when the attachment element 708 is inserted, and then as it retakes its original form, provide a retaining force on the attachment element 708 in order to provide a secure connection. Alternatively, the generally cylindrical portion 710 may be configured to elastically deform when inserted, and then as it retakes its original form, it provides a retaining force on the receiving portion. Each generally cylindrical portion 710 may also comprise a notch 712, such that the snap fit between the cylindrical portion 710 and the receiving portion is secured. The connection is held in place by engagement of the notch 712 with a corresponding part of the receiving portion, as will be explained in relation to FIGS. 6a, 6b, 7c and 11 to 13. This provides an additional or alternative means for connecting the attachment member 700a to the panels to which it is attached. For example, when the attachment elements 708 are used for connecting the attachment member 700a to a panel, the holes 704 are left free for connection of additional elements such as an adjustable foot 900, or a suspension member 1200. The position of the attachment elements 708 may correspond to that of the threaded portions 702. The cylindrical portion 710 of the attachment member may be configured to receive a part that can be screwed into the threaded portion 702. For example, the internal surface of the cylindrical portion 710 may also be threaded in order to receive a part with a corresponding thread. In this way, additional parts can be connected to the attachment member 700a. An example of an attachment member 700a assembled with a connector 300 is shown in FIGS. 11a and 11b.

An attachment member 700 may have other shapes than the elongate form shown in FIGS. 5a and 5b. This may facilitate the assembly of panels 200 in different configurations, such as those shown in FIGS. 3b and 3c. Two examples of alternative attachment members 700 are shown in FIGS. 5c to 5f.

Figure 5C:
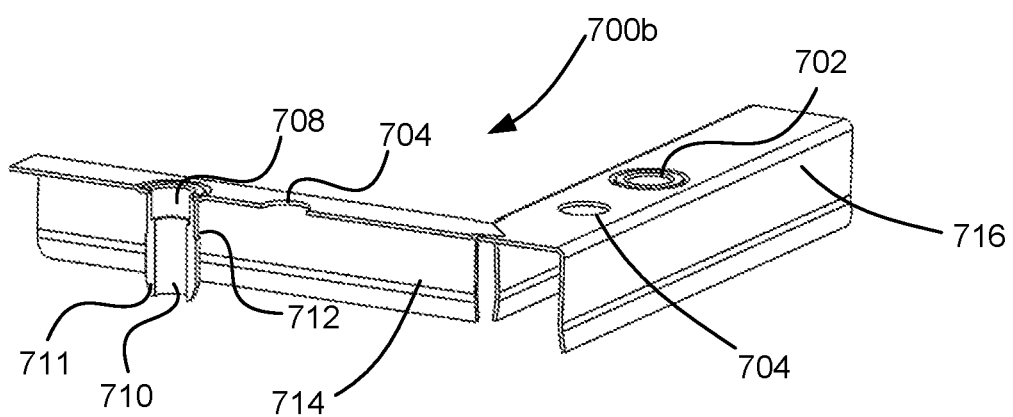
FIG. 5c is a partial cross-section view of an L-shaped attachment member according to one embodiment.
Figure 12A:
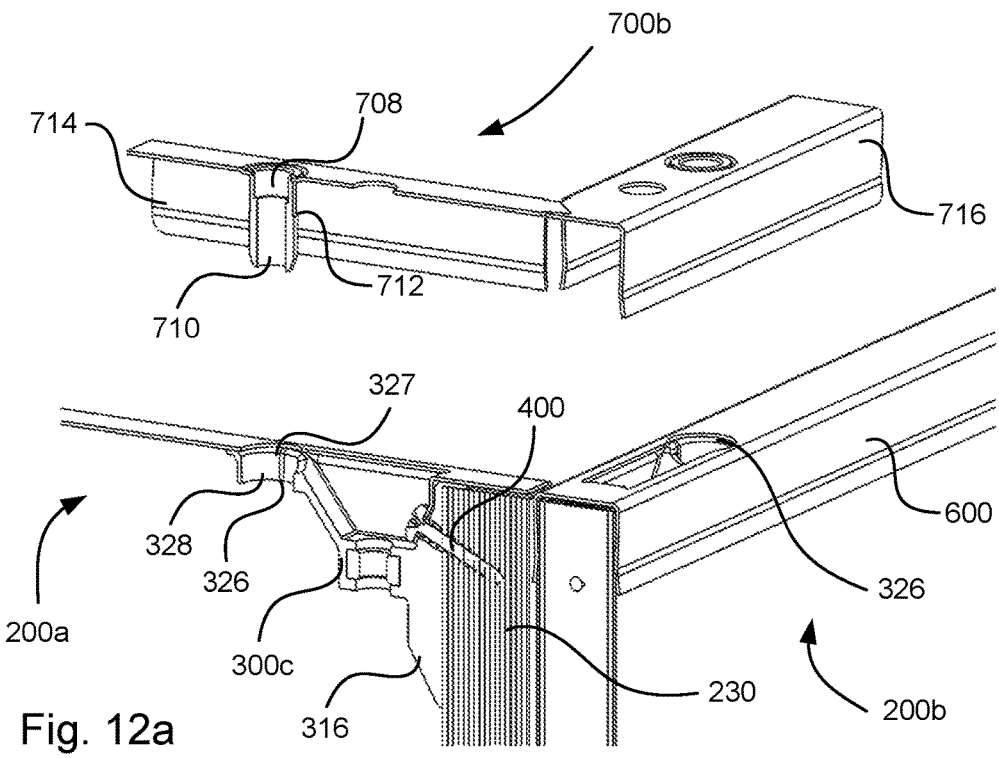
FIG. 12a is an exploded cross-section view of a room divider system comprising an L-shaped attachment member according to one embodiment.
Figure 12B:
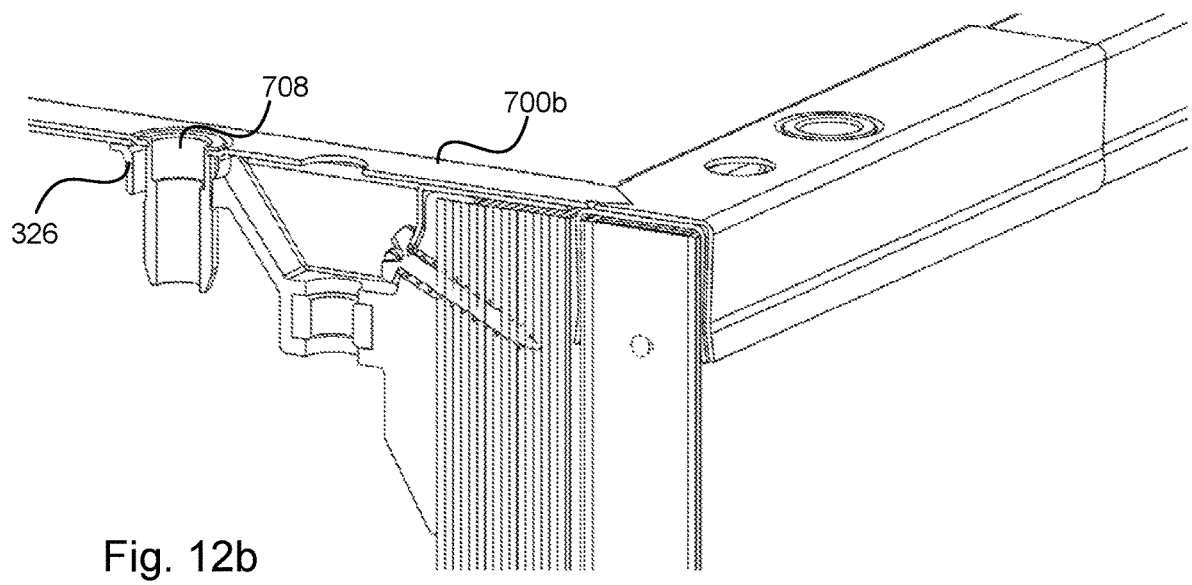
FIG. 12b is a perspective cross-section view of a room divider system comprising an L-shaped attachment member according to one embodiment.

Referring to FIG. 5c, a third embodiment of an attachment member 700 is shown in partial cross-section. In this embodiment, the attachment member 700b has an L-shape. That is, the attachment member 700b comprises a first leg 714, shown in cross-section, and a second leg 716, joined at an apex 722 (shown in FIGS. 5d and 5e). In this embodiment, the legs 714, 716 are joined at a 90° angle. This allows two panels to be attached to each other perpendicularly as shown in FIG. 3b, with the first leg 714 to be attached to a first panel and the second leg 716 to be attached to a second panel. Similarly to the attachment member 700a shown in FIGS. 5a and 5b, the legs 714, 716 of the attachment member 700b have a generally U-shaped cross-section. In some embodiments the attachment member 700b of FIG. 5c comprises a threaded portion 702, a hole 704 and an attachment element 708 corresponding to each panel to which it will be attached. As such, each of the first leg 714 and the second leg 716 shown in FIG. 5c comprises a threaded portion 702, a hole 704 and an attachment element 708. However, it will be appreciated that any combination of threaded portions 702, holes 704 and attachment elements 708 that enable a suitable function of the attachment member 700b may be implemented. An example of an L-shaped attachment member 700*b* assembled with a connector 300 is shown in FIGS. 12*a* and 12*b*.

The L-shaped attachment member 700*b* can be configured to fit different corner arrangements of panels 200, depending on how the panels are assembled. As shown in FIG. 5*d*, a first panel 200*a* is placed next to a second panel 200*b* at a right angle. The panels are placed such that a long side 240*a* of the first panel 200*a* is in contact with a short side 250*b* of the second panel 200*b*. This means that a receiving portion 326 of the first panel 200*a*, configured to receive an attachment element 708, is closer to the apex 260 of the assembly than a receiving portion 326 of the second panel 200*b*. As such, the attachment member 700*b* is configured such that the attachment element 708 of the first leg 714 (indicated in this case by the position of the corresponding threaded portion 702) is closer to the apex 722 of the attachment member 700*b* than the attachment element 708 of the second leg 716 (also indicated by the position of the corresponding threaded portion 702). It will be appreciated that the receiving portions 326 could equally be receiving portions 606 of profiles 600 attached to respective panels.

In FIG. 5*e*, a first panel 200*a* is placed next to a second panel 200*b* at a right angle, although the panels are now placed such that a short side 250*a* of the first panel 200*a* is in contact with a long side 240*b* of the second panel 200*b*. This means that the receiving portion 326 of the second panel 200*b* is closer to the apex 260 of the assembly than the receiving portion 326 of the first panel 200*a*. As such, the attachment member 700*b* is configured such that the attachment element 708 of the second leg 716 (indicated in this case by the position of the corresponding threaded portion 702) is closer to the apex 722 of the attachment member 700*b* than the attachment element 708 of the first leg 714 (also indicated by the position of the corresponding threaded portion 702). It will be appreciated that the attachment member 700*b* as shown in FIGS. 5*c* to 5*e* can be rotated as appropriate to fit corners of different orientations. It will be appreciated that the receiving portions 326 could equally be receiving portions 606 of profiles 600 attached to respective panels.

Figure 13A:
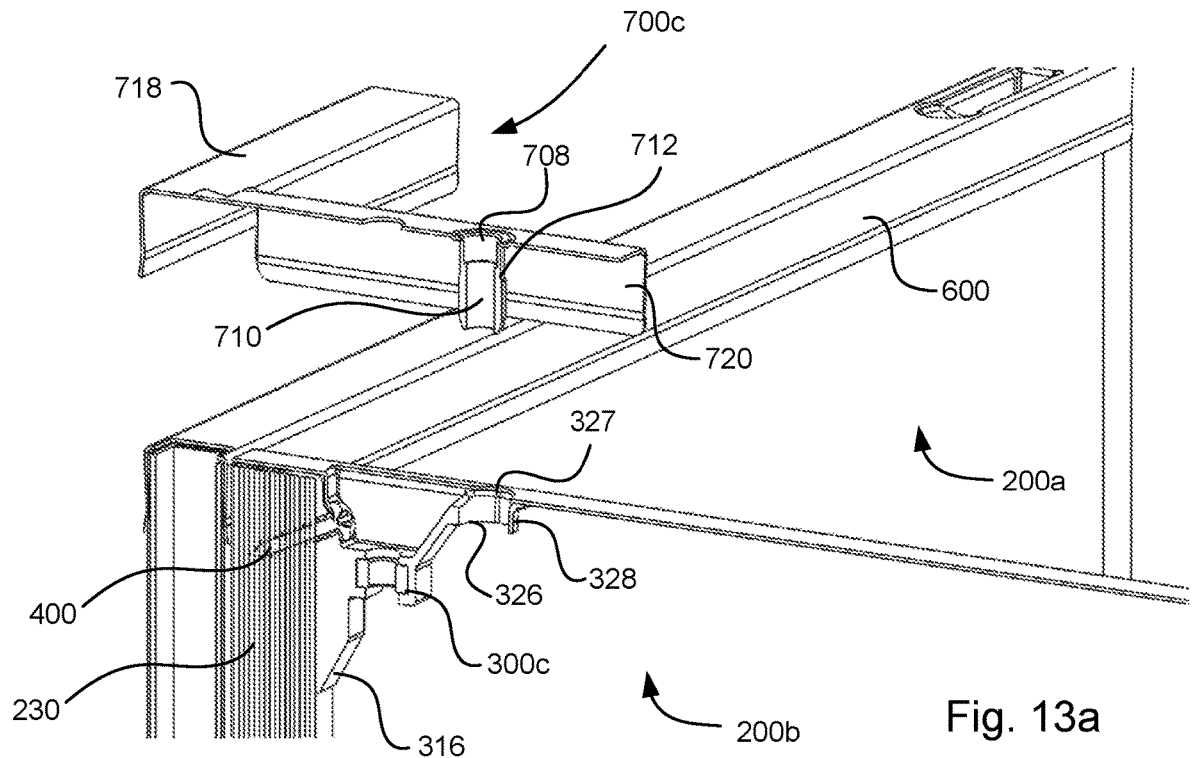
FIG. 13a is an exploded cross-section view of a room divider system comprising a T-shaped attachment member according to one embodiment.
Figure 13B:
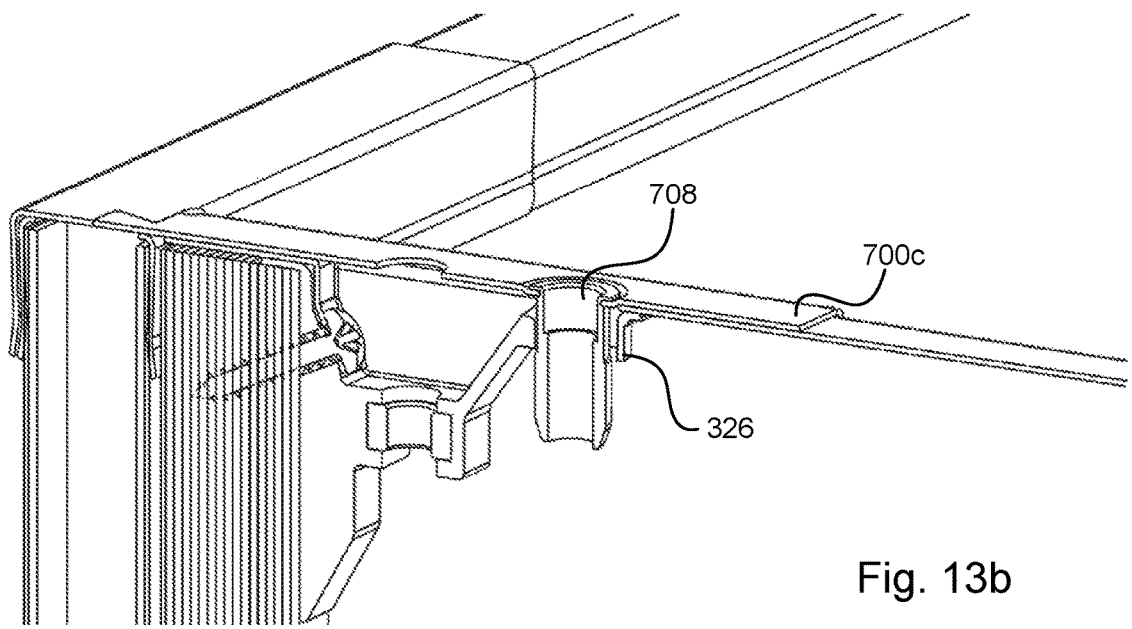
FIG. 13b is a perspective cross-section view of a room divider system comprising a T-shaped attachment member according to one embodiment.

Referring to FIG. 5*f*, a fourth embodiment of the attachment member 700 is shown in cross-section. In this embodiment, the attachment member 700*c* has a T-shape. That is, the attachment member 700*c* comprises a first leg 718 and a second leg 720, wherein the second leg 720 is joined at one end to a central part of the first leg 718, at a 90° angle. It will be appreciated that, to form a T-shaped attachment member, the second leg 720 can be joined at one end to the first leg 718 anywhere between the two ends of the first leg 718. FIG. 5*f* shown a cross-section of the attachment member 700*c* through a central axis of the second leg 720. This configuration allows two panels 200 to be attached to each other perpendicularly at a central part of one of the panels, as shown in FIG. 3*c*, with the first leg 718 to be attached to a first panel and the second leg 720 to be attached to a second panel. In this embodiment, as the attachment member 700*c* is attached at a central part of the first panel, where no connector 300 or profile 600 is present, only the second leg 720 comprises a threaded portion 702, a hole 704 and an attachment element 708. However, it will be appreciated that any combination of threaded portions 702, holes 704 and attachment elements 708 that enable a suitable function of the attachment member 700*c* may be implemented. An example of a T-shaped attachment member 700*c* assembled with a connector 300 is shown in FIGS. 13*a* and 13*b*.

In some embodiments, the attachment member 700*c* may be configured to attach to three panels 200. In these embodiments, the first leg 718 may comprise two attachment elements 708 at each end. The two attachment elements 708 may be configured to attach to two separate panels arranged adjacently along the axis of the first leg 718. The second leg 720 may then be attached to a third panel arranged perpendicularly to the first and second panels.

The different types of attachment member shown in FIGS. 5*a* to 5*f* allow panels to be assembled in different configurations to form different types of divider, for example as shown in FIGS. 3*a* to 3*c*. It will be envisaged by the skilled person that different types of attachment member can be used to create different configurations. For example, in some embodiments, an X-shaped attachment member 700 could be provided to attach four panels assembled at right angles to each other, or two panels assembled either side of and perpendicular to a third panel. In some embodiments, the attachment member 700 may be implemented with legs disposed at any suitable angle, for example an attachment member 700 having a 45° bend. In some embodiments, the attachment member 700 may comprise a hinge such that it is adjustable.

Figure 6A:
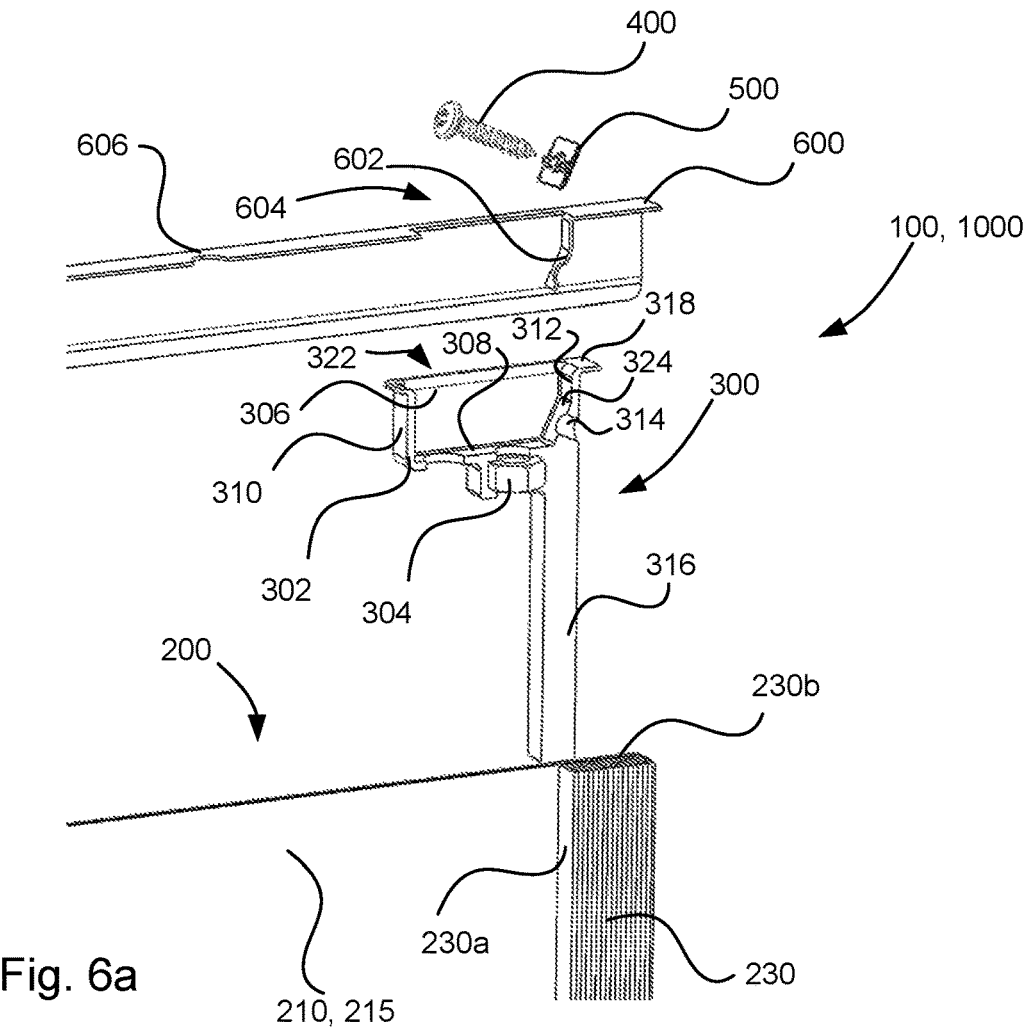
FIG. 6a is an exploded cross-section view of a room divider system according to one embodiment.
Figure 6B:
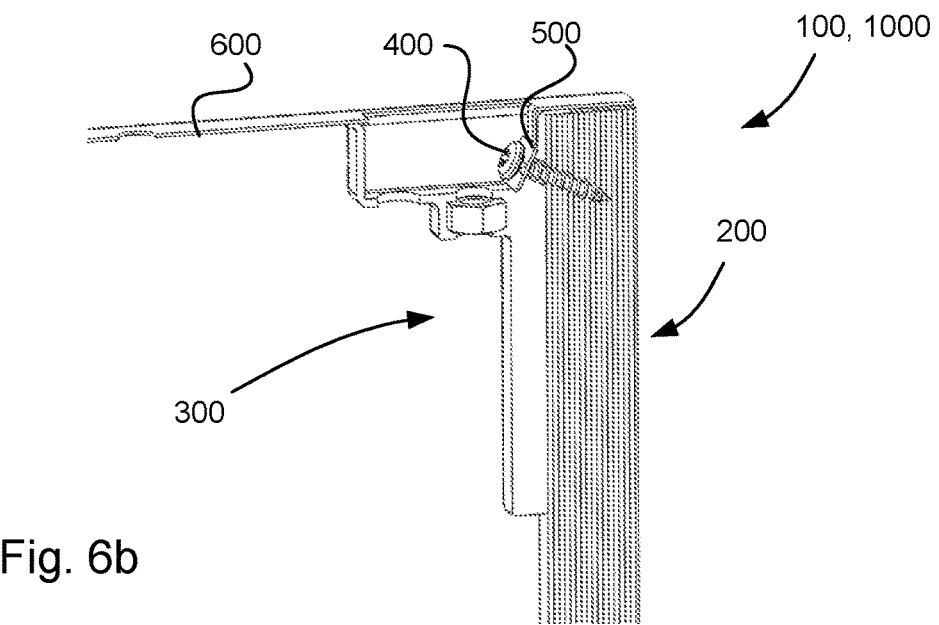
FIG. 6b is a perspective cross-section view of a room divider system according to one embodiment.

As is understood, each support 800 and/or each attachment member 700*a*-*d* and/or each adjustable foot 900 needs to be securely attached to each panel 200. The room system 100 shown in FIGS. 6*a* and 6*b* achieves this by providing an interface 1000 comprising a connector 300 attachable to a lath 230 of each panel 200. FIG. 6*a* shows an exploded view of the room divider system 100, while FIG. 6*b* shows a room divider system 100 having the interface 1000 mounted to the panel 200. The interface 1000 comprises a connector 300 attachable to the lath 230 by means of a fastener 400. The interface 1000 may further comprise a profile 600 and/or a washer 500.

As shown in FIG. 6*a*, a connector 300 is attached to the short side 230*b* of a lath 230. The connector 300 is attached by means of a fastener 400, such as a screw, inserted into the lath 230, e.g. the first lath 231. Further, another connector 300 may be attached to the second lath 232 at an end of the second lath 232. However, the connector 300 may be attached to any of the laths 230, 231, 232, 233, 234, 235, 236 of the panel 200. In the embodiment shown in FIG. 1*b*, connectors 300 may preferably be attached to the first lath 231 and to the second lath 232, respectively.

In FIG. 6*a*, the connector 300 is depicted as a part of an interface 1000 of the room divider system 100. The connector 300 forms a rigid structure for attaching associated equipment to the panel, as it is at least partially inserted in the cavity that is formed between the first and second sheets 210, 215 of the panel 200 and then securely attached to a sidewall 230*a* of the lath 230. Preferably, a connector 300 is arranged on the first and second laths 230 that are arranged along the edges 211, 216 of the panel 200. Connectors 300 may also be arranged on third and fourth laths 233, 234, or on any other lath 230, 233, 234, on the panel 200. The fastener 400 attaches the connector 300 to the lath 230 through an opening 314 in an inclined surface 324 on a main portion 302 of the connector 300. The main portion 302 is essentially cuboid in shape, and preferably corresponds essentially in width to the distance between the sheets 210, 215. The main portion 302 hence comprises a bottom wall 308 having an essentially rectangular shape, and extending perpendicularly therefrom are four sidewalls 306, 310, 312. An opening 322 is arranged opposite the bottom wall 308, which allows access to the inside of the main portion 302 including the fastener 400 when attached. The sidewall 312 is configured to be arranged adjacent to the lath 230, and the bottom wall 308 and the vertical interior surface of the sidewall 312 are separated by the inclined surface 324. The inclined surface 324 forms the part of the sidewall 312 closest to the bottom wall 308. A rear surface is 320 arranged on the other side of the wall 312 in relation to the inclined surface 324, and is intended to face the sidewall 230a of the lath 230. The rear surface 320 is configured to abut against the sidewall 230a of the lath 230 when the connector 230 is mounted thereto.

The opening 314 in the inclined surface 324 preferably extends essentially perpendicularly to the inclined surface 324 to the other side of the wall 312 and hence through to the rear surface 320. Therefore, the fastener 400, which preferably is a screw, will be screwed into the lath 230 at angle α (shown in FIG. 9) in relation to the longitudinal extension of the lath 230. The angle α is preferably larger than 0°, more specifically larger than 45°, such as larger than 45° and up to 75°, and in one embodiment approximately 60°. In other words, the inclined surface 324 faces upwards against the opening and towards the upper edge adjacent to the opening 322 of the wall 310 opposite the inclined surface 324. The fastener 400 will hence be arranged such that the head 402 thereof is more easily reached with an appropriate tool, such as a screwdriver, through the opening 322. The upper edge adjacent the opening 322 of the sidewall 310 may be used as a support for a screwdriver, facilitating correct alignment with the fastener 400. Another advantage of the inclined surface 324 and the resulting angled fastener arrangement is that a longer fastener 400 may be used without penetrating through the other side of the lath 230, thereby increasing the load that can be exerted on the connector 300.

A connection element 304 is arranged in the bottom wall 308 of the main portion 302 of the connector 300. The bottom wall 308 may comprise a cavity 309, shown in FIGS. 7a to 7c, for receiving the connection element. The connection element 304 is preferably a nut, but may just as well be any other type of connector or simply a thread arranged in the bottom wall 308. The connection element 304 is also accessible through the opening 322 in the connector 300, and hence serves as a connection point, for instance for connecting a fastening element for an attachment member 700, an adjustable foot 900, or a suspension member 1200.

Seeing as the lath 230 optionally comprises a number of strips 238 of material through which the fastener 400 must penetrate, certain problems arise. One problem is that, when attaching a screw type fastener at an angle that is not 90° to the surface of such a lath 230, the fastener will have a tendency to align with the longitudinal direction of the strips 238. This may result in the angle α decreasing and deviating from the desired angle to an unacceptable degree. Hence, a washer 500 is provided which mitigates this effect. The washer 500, as is shown in FIGS. 6a and 6b, is configured to be arranged adjacent to the fastener 400, the head 402 of the fastener 400 providing a compressing force to one side of the washer 500. As will be further explained in relation to FIGS. 8 to 10, the washer 500 comprises features that are configured to counter the possible effect of the strips 238 that constitute the lath 230.

What is also shown in FIGS. 6a and 6b is an optional profile 600, having a U-shaped cross-section and a flange 602 that is attachable by means of the fastener 400 to the connector 300. The profile 600 is connectable to each side of the panel 200 to protect and cover the openings that would otherwise be visible between the sheets 210, 215, thus serving as a trim piece. The profile 600 hence allows an end user to cut/modify the panel 200 and afterwards attach the profile 600, which will cover the cut. The profile 600 thus facilitates modification, as it will cover any eventual uneven cuts in the panel 200.

The profile 600 further comprises an opening 604 which essentially corresponds in shape with the opening 322 in the connector, and which is configured to be aligned with the opening 322 when mounted to the panel 200. Furthermore, as each panel 200 may be fitted with a connector 300 on two or more laths 230, which are all covered by a single profile 600, each profile 600 preferably comprises the same number of openings 604 as the number of possible connectors 300. The profile 600 may serve as a connector for the support 800 or for adjustable feet 900.

The profile 600 further comprises a receiving portion 606. The profile receiving portion 606 is configured to receive an attachment element 708 of an attachment member 700a-c. As discussed in relation to FIG. 5b, the attachment elements 708 are configured to be inserted into a profile receiving portion 606. The attachment elements 708 are configured to exert a retaining force on the profile receiving portion 606 when inserted. This is achieved by a snap fit between the attachment element 708 and the profile receiving portion 606. The profile receiving portion 606 may be configured to elastically deform when the attachment element 708 is inserted, and then as it retakes its original form, provide a retaining force on the attachment element 708 in order to provide a secure connection. Alternatively, the generally cylindrical portion 710 may be configured to elastically deform when inserted, and then as it retakes its original form, it provides a retaining force on the profile receiving portion 606. Each generally cylindrical portion 710 may also comprise a notch 712, such that the snap fit between the cylindrical portion 710 and the profile 600 is secured. The connection is held in place by engagement of the notch 712 with the profile receiving portion 606. This provides an additional or alternative means for connecting the attachment member 700a to the panels to which it is attached.

Furthermore, as can be made out from FIG. 6b, the connector 300 is configured to be arranged adjacent to a short side 230b of the lath 230. It is to be understood that while only one short side 230b of one lath 230 is shown, the other opposite short side 230b of each lath 230 may also be fitted with a connector 300. Further, the connector may not only be attached to the end of the lath, but also to the first sheet 210 and/or the second sheet 215. This may serve to provide a stronger attachment of the connector. This may be beneficial, especially in embodiments wherein the connector not is attached to the lath by means of a fastener 400. The attachment of the connector to the first sheet and/or the second sheet may be by means of an adhesive and/or by ultrasonic welding.

In order to relieve some of the load that is exerted on the fastener 400, and increase the load capability of the connector 300, especially in the longitudinal direction of the lath 230, a lip 318 may be provided. The lip 318 protrudes from the wall 312, more specifically the upper edge thereof adjacent to the opening 322. The lip 318 protrudes outwards from the rear surface 320 in the direction of the lath 230, such that it may be arranged abutting against the short side 230b of the lath 230.

Figures 7A, 7B:
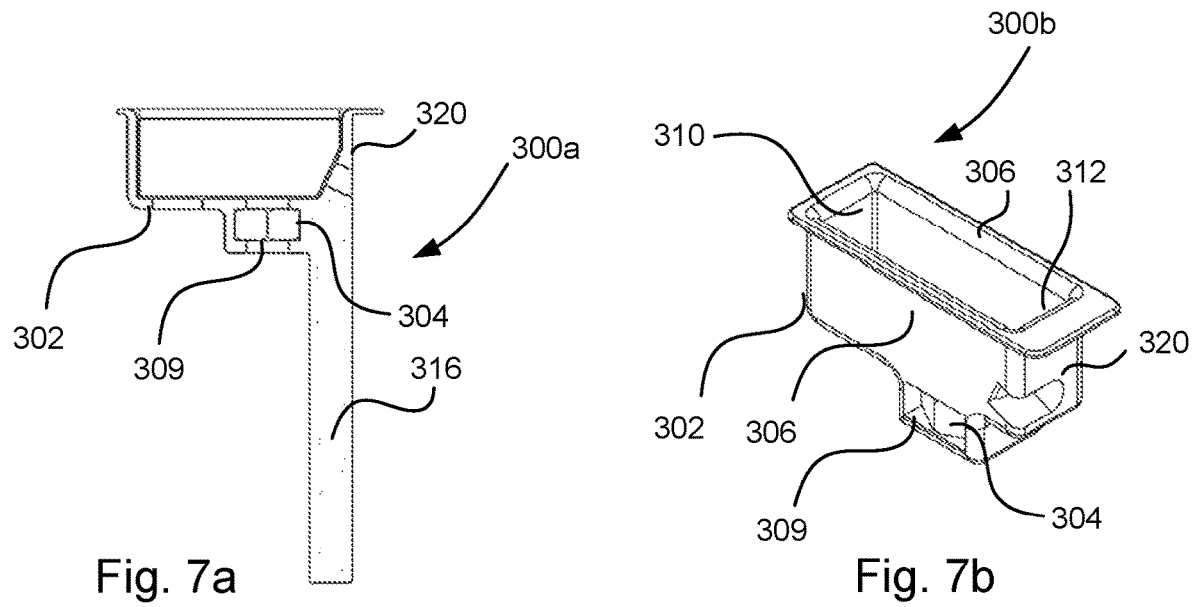
FIG. 7a shows a side view of a connector according to one embodiment.
FIG. 7b shows a perspective view of a connector according to one embodiment.

Referring now to FIG. 7a, one embodiment of a connector 300 is shown. The connector 300a comprises a cavity 309 into which a connecting element 304 can be fitted. The main portion 302 of the connector 300a, including the cavity 309, can be formed by injection molding. The connecting element 304 can then be inserted into the cavity 309 for connecting a fastening element for an attachment member 700, an adjustable foot 900, or a suspension member 1200. The connector 300a is preferably made out of a polymeric material such as a plastic material. It may however also be made from a metallic material such as aluminum.

The connector 300a also comprises a supporting bar 316 configured to extend in the longitudinal direction of the lath 230 between the first and second sheets 210, 215 of the panel 200, as shown in FIGS. 6a and 6b. As shown in FIG. 7a, the supporting bar 316 essentially extends the rear surface 320 downwards away from the main portion 302 of the connector 300a. The supporting bar 316 serves to improve the stability the connector 300a as it distributes an eventual rotating force, a torque applied on the connecting element 304, over a larger surface area on the sheets 210, 215 as well as on the lath 230. The supporting bar 316 hence preferably has a width corresponding to that of the main portion 302 and hence also to the distance between the sheets 210, 215.

In one embodiment of the room divider system 100, each connector 300 that is configured to be arranged along a bottom edge 206 of the panel 200 comprises a supporting bar 316. The bottom edge 206 (shown in FIG. 3a) is usually subjected to higher loads, especially if the room divider system 100 is arranged standing on the floor. For instance, if a force is applied perpendicularly to a sheet 210, 215 of a panel 200 that is standing upright, such a force will be received as a torque on each connector 300a connected to the panel 200. However, connectors 300 arranged along a top edge 207 may also comprise a supporting bar 316.

In FIG. 7b, another embodiment of a connector 300 is shown. The connector 300b comprises a main portion 302 identical to that of the embodiment shown in FIG. 7a, with the exclusion of the supporting bar 316. The connector 300b shown in FIG. 7b is beneficial for use in applications when it can be predicted that the connector 300 will not be subjected to high torque loads, and hence can material be saved by omitting the supporting bar 316. For instance, such a connector 300b is suitable to use on each lath 230 along the upper edge 207 (shown in FIG. 3a) of the panel(s) 200. The connector 300b is preferably made out of a polymeric material such as a plastic material. It may however also be made from a metallic material such as aluminum.

Figure 7C:
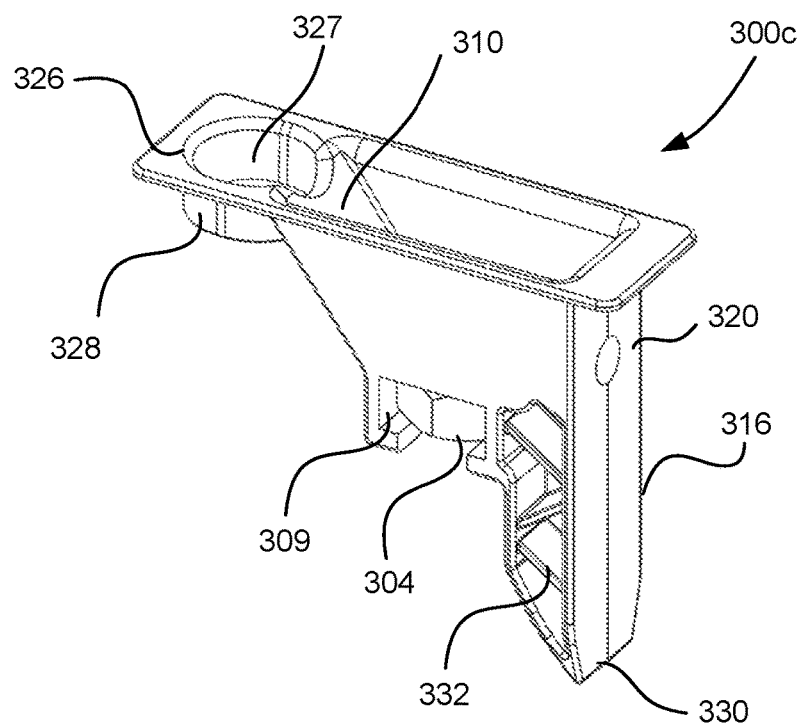
FIG. 7c shows a perspective view of a connector according to one embodiment.

In FIG. 7c, another embodiment of a connector 300 is shown. The connector 300c comprises a main portion 302 similar to that of the embodiment shown in FIG. 7a, although an additional receiving portion 326 is provided. The connector receiving portion 326 is attached to and extends from the sidewall 310 of the main portion 302. In this embodiment, the sidewall 310 is inclined at an angle with respect to the rear surface 320 of the connector 320. The connector receiving portion 326 comprises a hole 327 and a sleeve portion 328. As discussed in relation to FIG. 5b, the attachment elements 708 are configured to be inserted into a connector receiving portion 326. The attachment elements 708 are configured to exert a retaining force on the connector receiving portion 326 when inserted. This is achieved by a snap fit between the attachment element 708 and the connector receiving portion 326. The connector receiving portion 326 may be configured to elastically deform when the attachment element 708 is inserted, and then as it retakes its original form, provide a retaining force on the attachment element 708 in order to provide a secure connection. Alternatively, the generally cylindrical portion 710 may be configured to elastically deform when inserted, and then as it retakes its original form, it provides a retaining force on the connector receiving portion 326. Each generally cylindrical portion 710 may also comprise a notch 712, such that the snap fit between the cylindrical portion 710 and the connector 300 is secured. The bottom edge of the sleeve portion 328 may engage with the notch 712 of the attachment element 708 to ensure a secure connection. The hole 327 of the connector receiving portion 326 may be substantially elliptical in cross-section, in order to provide some tolerance for the alignment of the attachment member 700 and insertion of the attachment element 708. Alternatively, the connector receiving portion 326 may be implemented having an open profile. That is to say, the hole 327 and the sleeve portion 328 are only partially closed forming a half-pipe-like shape. In this way, increased tolerance is provided for the alignment of the attachment member 700 and insertion of the attachment element 708 whilst still providing engagement surfaces for the attachment element 708.

Furthermore, the supporting bar 316 of the connector 300c in the embodiment of FIG. 7c may also be different from that shown in the embodiment of FIG. 7a. In this embodiment, similar to that of FIG. 7a, the supporting bar 316 essentially extends the rear surface 320 downwards away from the main portion 302 of the connector 300. However, the supporting bar 316 of this embodiment is tapered along its extension to meet at a bottom edge 330. This taper allows the connector 300c to be inserted in the cavity that is formed between the first and second sheets 210, 215 of the panel 200 and alongside the sidewall 230a of the lath 230 without compressing the distance members 220 of the panel 200. By providing a taper, the connector 300c can be inserted between the first and second sheets 210, 215 more smoothly. The supporting bar 316 of the connector 300c may also comprise a number of slats 332. This construction gives the supporting bar 316 sufficient structural integrity, whilst also reducing material requirements and the overall weight of the connector 300c. It will be appreciated that such a construction could also be used in the supporting bar 316 of the connector 300a shown in FIG. 7a. The connector 300c is preferably made out of a polymeric material such as a plastic material. It may however also be made from a metallic material such as aluminum.

Figure 8A:
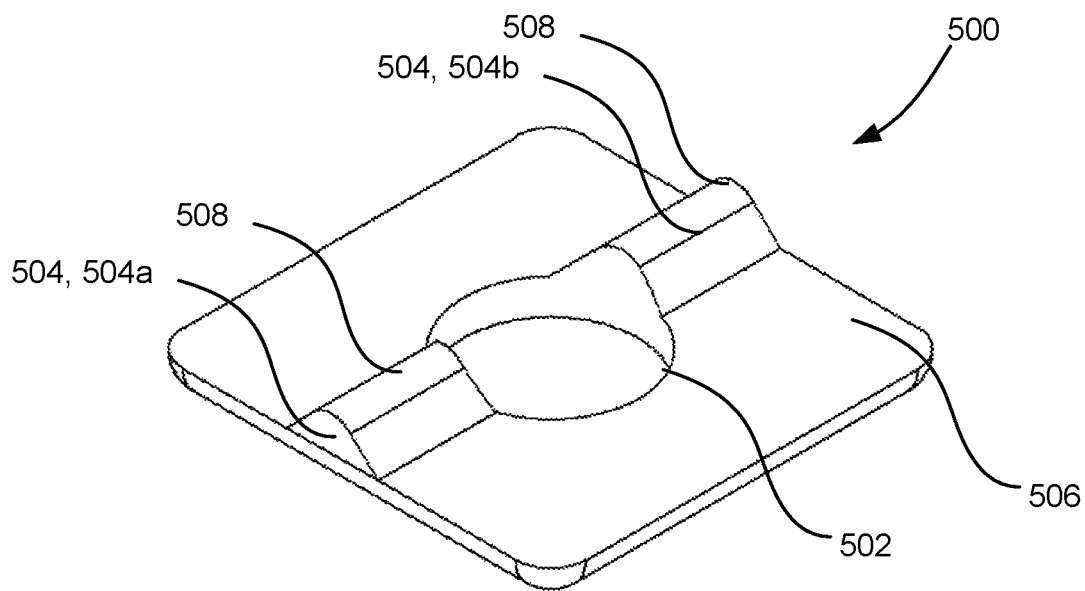
FIG. 8a shows a washer according to one embodiment.
Figure 8B:
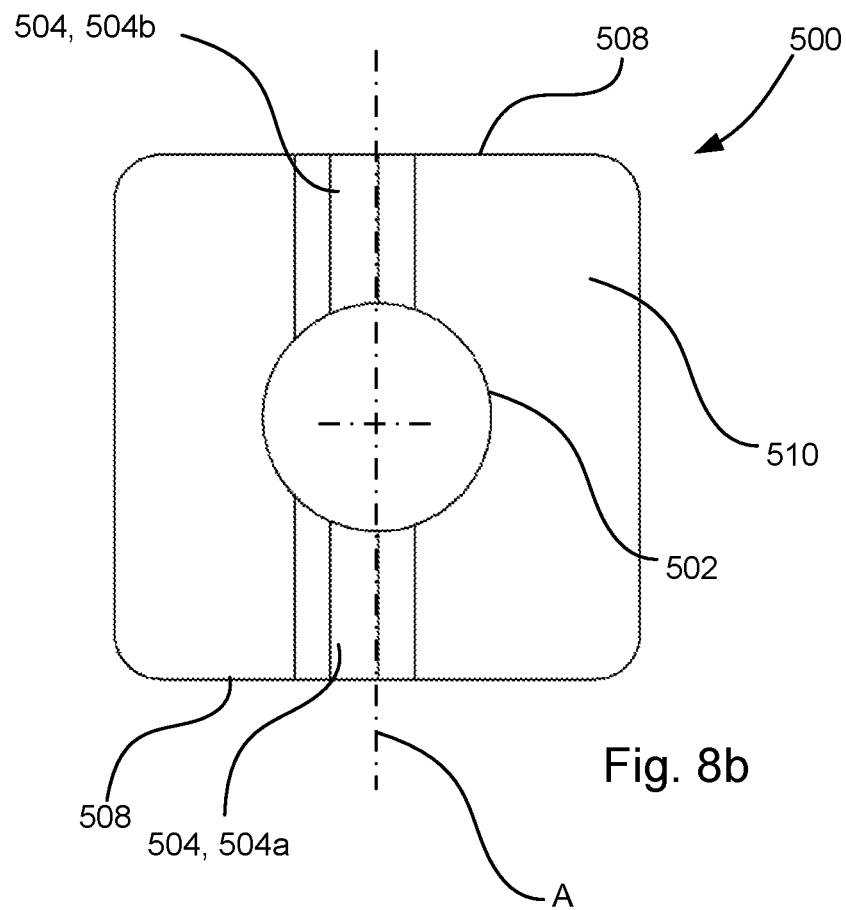
FIG. 8b shows a top view of a washer according to one embodiment.

Turning now to FIGS. 8a and 8b, the washer 500 is shown. The washer 500 is, as mentioned, configured to be arranged against the inclined surface 324. Naturally, in order to receive the fastener 400, the washer 500 further comprises a hole 502. The hole 502 is to be aligned with the opening 314 in the inclined surface 324. In order to prevent the fastener 400 attaining an undesired angle α, the washer 500 comprises at least one hill 504 on the surface 506 of the washer 500 configured to face away from the inclined surface 324, i.e. on the surface 506 which is configured to face the head 402 of the fastener 400. The top 508 of the at least one hill 504 is arranged only on one side of a line A parallel with the surface 506 and extending through the center of the hole 502. Thereby a non-symmetric contact area is formed between the washer 500 and the fastener 400. The top of the hill 504 is pressed against the head 402 of the fastener 400 forming a torque that counters the effect that the strips 238 of material in the lath 230 have on the fastener 400. As is shown, the washer 500 may comprise two hills 504a, 504b that are separated by the hole 502. Furthermore, the washer 500 may have a rectangular shape. Preferably, the washer 500 has a shape that corresponds to the shape of the inclined surface 324 such that, when placed against the inclined surface 324, it is held in place so that it will not rotate in relation to the connector 300. This is important as it serves to keep the hills in the correct position in relation to the connector 300 as will be further explained below.

Figure 9:
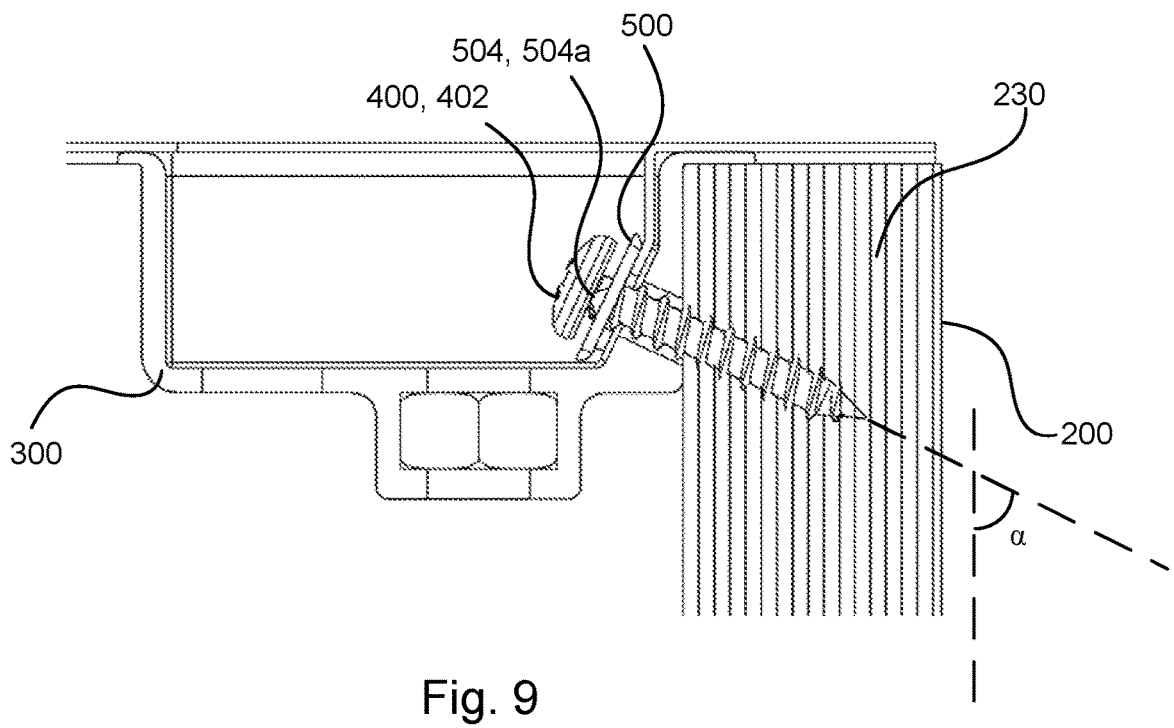
FIG. 9 shows a side view of a room divider system according to one embodiment.

In order to achieve the desired effect from the washer 500, it should preferably be arranged such that the line A is essentially parallel with the bottom wall 308 and such that the top 508 of the at least one hill 504 is arranged on the side of the washer 500 defined by the line A being closest to the bottom wall 308. That is to say, if the line A divides the washer 500 into two sides, the washer 500 should be arranged such that the side that comprises the top 508 of the hills 504 is closest to the bottom wall 308. This arrangement is shown in FIG. 9, where the at least one hill 504 is shown being arranged below the longitudinal axis of the fastener 400, i.e. closer to the bottom wall 308 in the connector 300. In the manner with which the fastener 400 is arranged in relation to the lath 230 in FIG. 9, it will have a tendency to reduce the angle α as it is being screwed through the strips 238. The top 508 of the hill 504 pushes against the head 402 such that a countering torque is formed, hence mitigating the natural tendency of the fastener 400 to deviate from the desired angle α. The washer 500 is preferably made out of a metallic material such as steel or aluminum, but it may also be made from a polymeric material such a plastic material.

Figure 10:
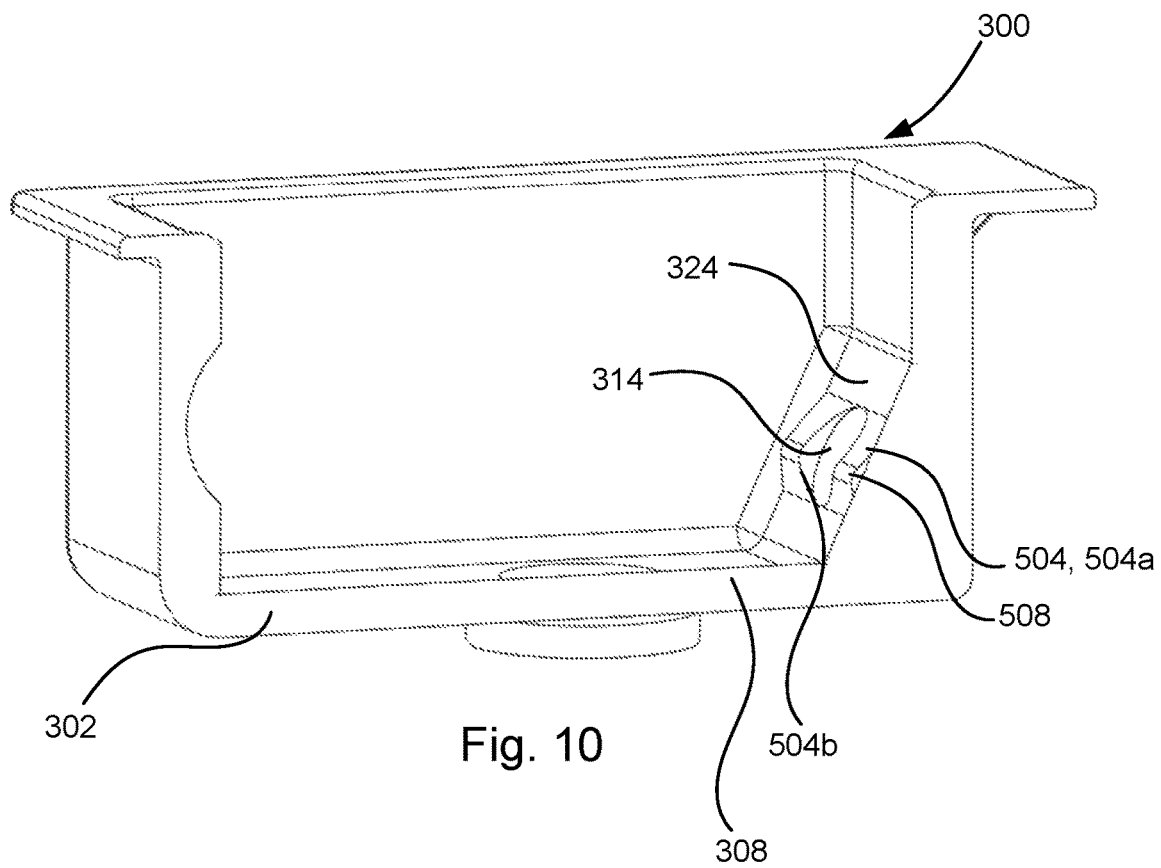
FIG. 10 shows a perspective view of a connector according to one embodiment.

In one embodiment shown in FIG. 10, in which no separate washer 500 is used, the washer is integrated in the inclined surface, i.e. the hills 504, 504a, 504b may instead be arranged on the inclined surface 324. The top 508 of the hills 504a, 504b is to be arranged in the manner that is described in relation to the separate washer 500, i.e. such that the top 508 is arranged below the center axis of the hole 314, i.e. closer to the bottom wall 308.

FIGS. 11a and 11b show an elongate attachment member 700a, as shown in FIGS. 5a and 5b, being assembled onto two adjacent panels 200a-b using respective connectors 300. FIG. 11a is an exploded cross-section view of a room divider system comprising an elongate attachment member 700a according to one embodiment. As described in relation to FIGS. 6a and 6b, a connector 300 is attached to a lath 230 of each panel 200 by a fastener 400. In this case, the connector is a connector 300c as shown in FIG. 7c. A profile 600 may be connected to the top edge of each panel 200, serving as a trim piece. A first end 724 of the attachment member 700a is positioned to fit over a first panel 200a. A second end 726 of the attachment member 700a is positioned to fit over a second panel 200b. As such, the attachment elements 708 are positioned generally in line with the receiving portions 326 of the connectors 300c present in each panel 200. When attached, the attachment elements 708 will pass through the holes 327 in the connector receiving portions 326, thus providing a snap fit, and the notches 712 of the attachment elements 708 will engage the bottom edge of the sleeve portions 328 of the connector receiving portions 326. FIG. 11b is a perspective cross-section view of an assembled room divider system comprising an elongate attachment member 700a. As is shown, the attachment element 708 is engaged with the connector receiving portion 326 in a snap fit, securing the attachment member 700a in place. When assembled, the attachment member 700a holds the panels together and covers the slit between the two panels that can be seen in FIG. 11a. By pushing the panels together, sound is essentially prevented from passing between them, as the gap has been closed. Further, the stability of an assembled room divider system is improved once the panels are pressed together, as they form a common block.

FIGS. 12a and 12b show an L-shaped attachment member 700b, as shown in FIG. 5c, being assembled onto two perpendicular panels 200a-b using respective connectors 300. FIG. 12a is an exploded cross-section view of a room divider system comprising an L-shaped attachment member 700b according to one embodiment. A connector 300c is attached to a lath 230 of each panel 200 by a fastener 400. A profile 600 may be connected to the top edge of each panel 200, serving as a trim piece. The first leg 714 of the attachment member 700b is positioned to fit over a first panel 200a. The second leg 716 is positioned to fit over a second panel 200b. As such, the attachment elements 708 are positioned generally in line with the receiving portions 326 of the connectors 300c present in each panel 200. When attached, the attachment elements 708 will pass through the holes 327 in the connector receiving portions 326, thus providing a snap fit, and the notches 712 of the attachment elements 708 will engage the bottom edge of the sleeve portions 328 of the connector receiving portions 326. FIG. 12b is a perspective cross-section view of an assembled room divider system comprising an L-shaped attachment member 700b. As is shown, the attachment element 708 is engaged with the connector receiving portion 326 in a snap fit, securing the attachment member 700b in place. When assembled, the attachment member 700b holds the panels together and covers the slit between the two panels that can be seen in FIG. 12a. By pushing the panels together, sound is essentially prevented from passing between them, as the gap has been closed. Further, the stability of an assembled room divider system is improved once the panels are pressed together, as they form a common block.

FIGS. 13a and 13b show a T-shaped attachment member 700c, as shown in FIG. 5d, being assembled onto two perpendicular panels 200a-b using respective connectors 300. FIG. 13a is an exploded cross-section view of a room divider system comprising a T-shaped attachment member 700c according to one embodiment. A connector 300c is attached to a lath 230 of each panel 200 by a fastener 400. A profile 600 may be connected to the top edge of each panel 200, serving as a trim piece. The first leg 718 of the attachment member 700c is positioned to fit over a central part of a first panel 200a. The second leg 720 is positioned to fit over an end part of a second panel 200b. As only the second leg 720 is to be attached to a connector 300c of a panel, only the second leg 720 comprises an attachment element 708. The attachment element 708 is positioned generally in line with the receiving portion 326 of the connectors 300c present in the second panel 200b. When attached, the attachment elements 708 will pass through the hole 327 in the connector receiving portion 326, thus providing a snap fit, and the notch 712 of the attachment element 708 will engage the bottom edge of the sleeve portion 328 of the connector receiving portion 326. FIG. 13b is a perspective cross-section view of an assembled room divider system comprising a T-shaped attachment member 700c. As is shown, the attachment element 708 is engaged with the connector receiving portion 326 in a snap fit, securing the attachment member 700c in place. When assembled, the attachment member 700c holds the panels together and covers the slit between the two panels that can be seen in FIG. 13a. By pushing the panels together, sound is essentially prevented from passing between them, as the gap has been closed. Further, the stability of an assembled room divider system is improved once the panels are pressed together, as they form a common block.

Figure 14A:
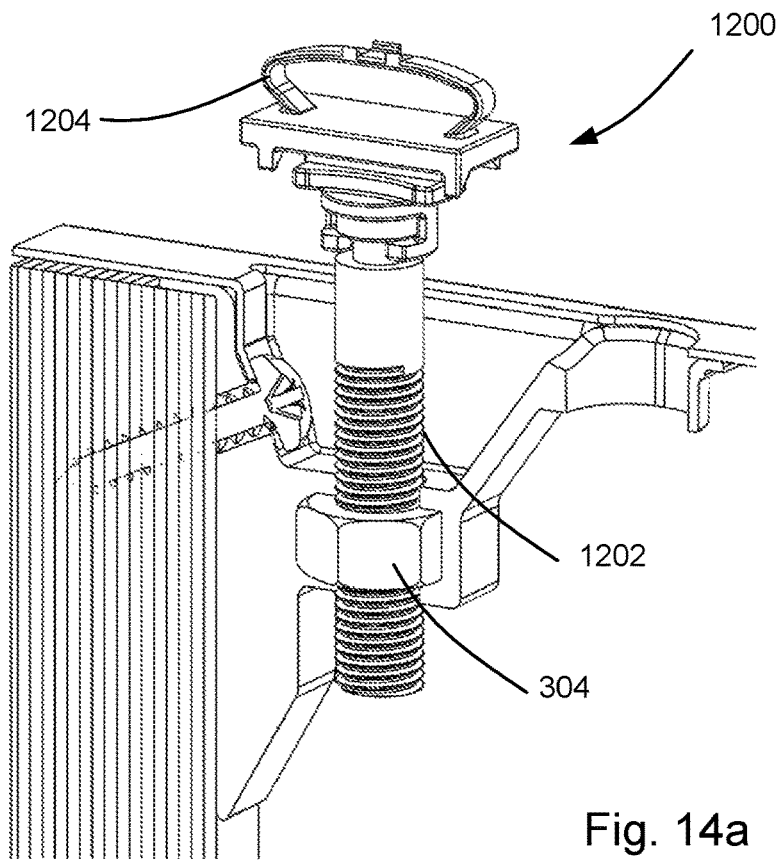
FIG. 14a is a perspective view of a suspension member for use in a room divider system with a sliding room divider according to one embodiment.
Figure 14B:
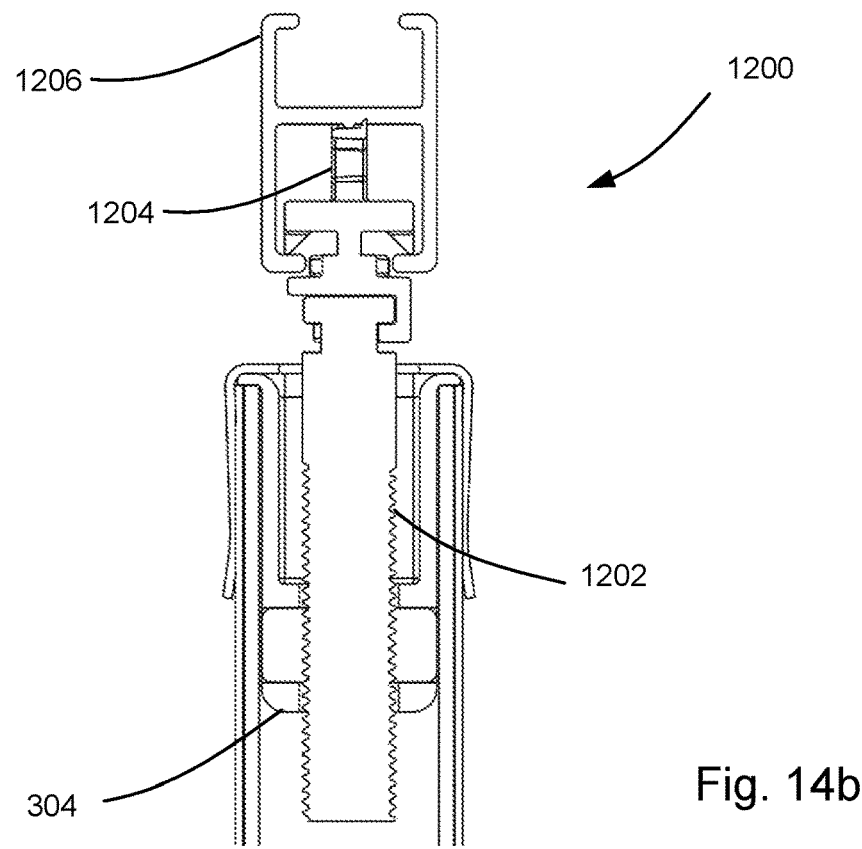
FIG. 14b is a cross-section view of a room divider system with a sliding room divider according to one embodiment.

FIG. 14a shows a suspension member 1200 for use in a room divider system with a sliding door according to one embodiment. The suspension member 1200a comprises a connection part 1202 and a suspension part 1204. The connection part 1202 allows the suspension member 1200 to be attached to a connection element 304 arranged in the bottom wall 308 of the main portion 302 of the connector 300, as discussed above. In this embodiment, the connection part 1202 is a bolt and the connection element 304 is a nut, but any suitable type of connection may be formed between the connector and the suspension member 1200. The connection element 304 is accessible through the opening 322 in the connector 300. Although not shown in FIG. 14a, the connection element 304 is also accessible through a hole 704 in an attachment element 700. The suspension part 1204 is configured to be attached to a rail 1206 (shown in FIG. 14b) that is attached to a wall or ceiling of a room. The suspension part 1204 may be slidably attached to the rail such that the panel can be slid along the rail to provide a sliding room divider, such as a sliding door.

Figure 15A:
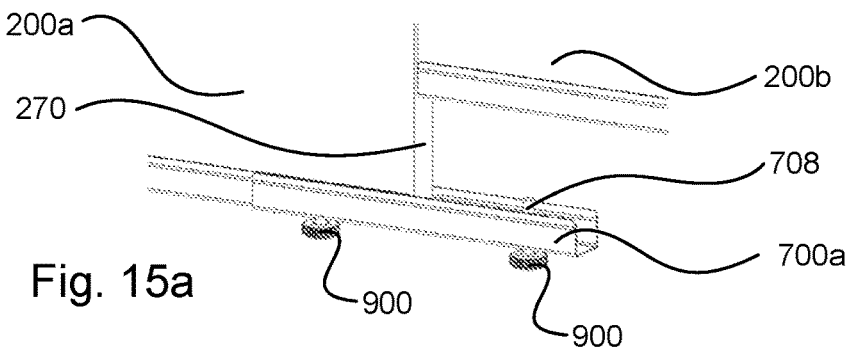
FIG. 15a shows a first stage of an assembly sequence for assembling two panels into a room divider system according to one embodiment.
Figure 15B:
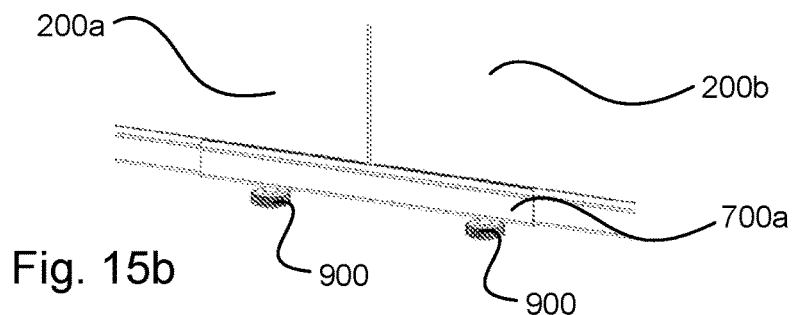
FIG. 15b shows a second stage of an assembly sequence for assembling two panels into a room divider system according to one embodiment.
Figure 15C:
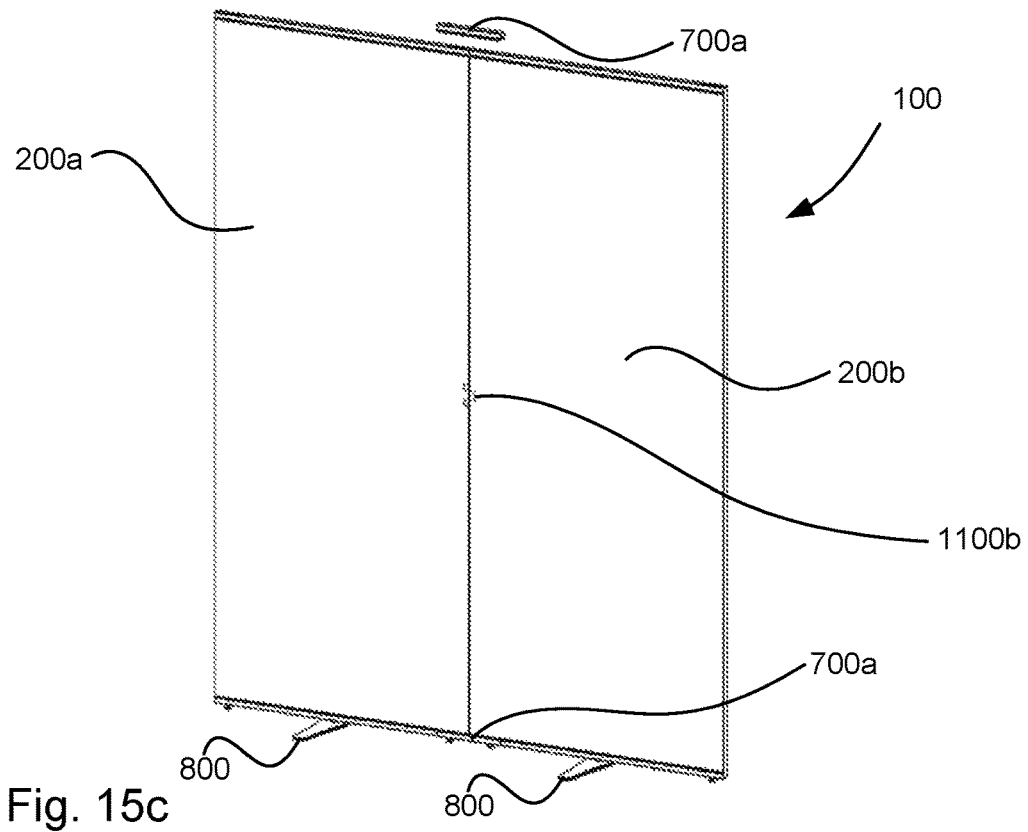
FIG. 15c shows a third stage of an assembly sequence for assembling two panels into a room divider system according to one embodiment.

FIG. 15a to FIG. 15c show the assembly of a first panel 200a next to a second panel 200b into room divider system 100. As shown in FIG. 15a, the first panel 200a is firstly positioned in an upright position on the floor. Before positioning the first panel 200a on the floor, an elongate attachment member 700a (shown in FIGS. 5a and 5b) is attached to a lower corner of the first panel 200a. The lower elongate attachment member 700a may be connected to the first panel 200a via a connector 300 or a profile 600 (not shown), as has been described herein above, e.g. in relation to FIGS. 11a-b. The lower elongate attachment member 700a may be provided with adjustable feet 900. Once positioned in an upright position on the floor, an attachment element 708 of the first attachment member 700a is accessible from above, as can be seen on the right-hand side of FIG. 15a. In order to allow for assembly of a room divider system 100 comprising several panels 200, it is important that panels 100 may be assembled in an upright position. Furthermore, it also advantageous that an adjustable foot 900 may be positioned on the floor before positioning a panel 200 on top of it, as it would be difficult to mount the adjustable foot 900 after assembly of the panels.

Figure 16B:
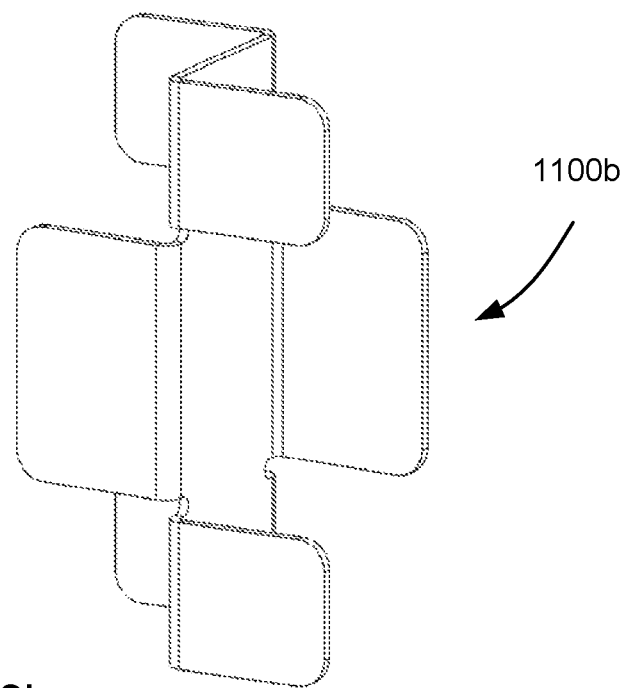
FIG. 16b shows an assembly support according to one embodiment.

In assembling the first panel 200a and the second panel 200b into room divider system 100, the second panel 200b is positioned next to the first panel 200b above the attachment element 708, as shown in FIG. 15a. In positioning the panels 200a, 200b next to each other, an assembly support 1100b is positioned in between them (FIG. 16b shows a close up of the support 1100b). The assembly support 1100b has two U-profile like portions facing in opposite directions. The U-profile like portions are arranged on the same base plate, i.e. the parallel sides in the U-profile like portions extend from the same base plate.

Subsequently, the second panel 200b is moved downwards such that the attachment element 708 engages with a connector 300 or profile 600 (not shown) of the second panel 200b, thereby retaining the lower ends of the first and second panels (200a, 200b) in an assembled position, as shown in FIG. 15b. In this position, the assembly support 1100b prevents the second panel 200b from falling over, as the first U-profile like portion engages with the first panel 200a and the second U-profile like portion engages with the second panel 200b.

In order to retain the upper ends of the first and second panels 200a, 200b in an assembled position, a second elongate attachment member 700a is attached to an upper connector 300 or profile 600 of each panel 200a, 200b, according to the principle described above with reference to FIGS. 11a-b. Before attaching the second elongate attachment member 700a, the first and second panels 200a, 200b are pushed together, as shown in FIG. 15c, to compress the fabric 270 (cf. FIG. 15a) folded over a lath 230 (not shown) of the hollow board material of the first panel 200a. The fabric 270 folded over the lath 230 is shown in FIG. 2b. The fabric 270 of the second panel 200b is also compressed. FIG. 15c hence illustrates the situation just before attaching the attachment member 700a.

Also shown in FIG. 15c are supports 800. The supports add additional stability to the assembled room divider system 100. During assembly, only one support 800 may be present, for example on the first panel 200a, in order to allow the first panel 200a to stand alone while the second panel 200b is being assembled. This makes the assembly process easier.

As each panel 200 may comprise several laths 230, 231, 232, 233, 234, 235, 236, each panel 200 may be fitted with several interfaces 1000. These may be mounted during manufacture, or be mountable by the costumer.

The hollow board material may be produced as disclosed in WO 2012/048738, which is incorporated in its entirety by reference. The fabric may be coated on the hollow board material after being assembled. Alternatively, the fabric may be coated on the sheets before being assembled. According to an embodiment, the non-woven fabric is a carded and cross-lapped, needle punched non-woven fabric. Preferably, the non-woven fabric is thermally bonded as well. According to an alternative embodiment, the fabric is a non-woven spunbond fabric. A non-woven spunbond fabric may be spun directly onto the sheet, before, or after, being assembled into hollow board material.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and other embodiments than those specifically described above are equally possible within the scope of these appended claims, e.g. different embodiments than those described above.

In the claims, the term "comprises/comprising" does not exclude the presence of other elements or steps. Additionally, although individual features may be included in different claims, these may possibly advantageously be combined, and the inclusion of two features in different claims does not imply that a combination of those features is not feasible and/or advantageous.

In addition, singular references do not exclude a plurality. The terms "a", "an", "first", "second" etc. do not preclude a plurality.

The invention claimed is:

1. A room divider system comprising:
   at least one panel having a first sheet and a second sheet spaced apart by at least one lath, the at least one lath having a first surface facing outwardly from the at least one panel, and a second surface opposite the first surface;
   a connector forming a rigid structure for associated equipment, the connector being configured to be at least partially inserted in a cavity formed between the first and the second sheets;
   wherein the connector is arranged adjacent to the second surface of the at least one lath; and
   wherein the connector is arranged to be attached to the at least one lath by a mechanical fastener penetrating through the connector and into the at least one lath at an angle (α) that is larger than 0° and les than 90° relative to a longitudinal extension of the at least one lath.

2. The room divider system according to claim 1, wherein the connector is attached to the second surface of the at least one lath and adjacent to a short side of the at least one lath.

3. The room divider system according to claim 2, wherein the connector comprises a lip protruding essentially perpendicularly from a rear surface of the connector, the rear surface being configured to face the second surface of the at least one lath, and wherein said the lip is configured to abut against the short side of the lath.

4. The room divider system according to claim 1, wherein the connector comprises a connection element for attachment of said the associated equipment.

5. The room divider system according to claim 4, wherein the connector comprises a main portion comprising a bottom wall into which the connection element is arranged.

6. The room divider system according to claim 5, wherein an opening is arranged opposite the bottom wall allowing access to the connection element and/or wherein the bottom wall of the connector comprises a cavity for insertion of the connection element.

7. The room divider system according to claim 4, wherein the connection element is a threaded device.

8. The room divider system according to claim 1, wherein the connector comprises a receiving portion comprising a sleeve portion configured to engage with a notch of an attachment element of an attachment member.

9. The room divider system according to claim 8, wherein the receiving portion further comprises a hole configured to receive the attachment element and/or wherein a retaining force is provided between the attachment element and the receiving portion when the attachment element is attached to the receiving portion.

10. The room divider system according to claim 1, wherein the connector configured to be arranged along a bottom edge and/or a top edge of the panel comprises a supporting bar configured to extend in a longitudinal direction of the lath between the first and the second sheets of the panel, wherein the supporting bar is arranged on the connector such that it extends adjacent to the lath when the connector is attached to the lath, and/or wherein the supporting bar is tapered along its extension, and/or wherein the supporting bar comprises a number of slats.

11. The room divider system according to claim 1, wherein a plurality of distance members are arranged between the first sheet and the second sheet, the plurality of distance members being connected to the first sheet and to the second sheet, the respectively, wherein a first and a second lath, each comprising a plurality of strips arranged on top of each other, are arranged in parallel between the first sheet and the second sheet along opposite edges of the panel, the first and the second lath being connected to the first sheet and to the second sheet respectively, thereby providing a hollow board material, and wherein at least one of the first and the second sheet, at the outer surface, is coated with a fabric.

12. The room divider system according to claim 1, wherein the mechanical fastener is a screw.

13. The room divider system according to claim 12, wherein the connector comprises an inclined surface being configured to guide the fastener to attach to the at least one lath at an angle (α) being larger than 0° in relation a longitudinal extension of the at least one lath.

14. The room divider system according to claim 13, further comprising at least one washer, and wherein the connector is attachable to said the at least one lath by the fastener via the washer, the washer being configured to be arranged against the inclined surface, wherein the washer further comprises a hole through which the fastener is receivable and which is configured to be aligned with an opening in the inclined surface, and wherein the washer further comprises at least one hill on the surface of the washer configured to face away from the inclined surface, and wherein the at least one hill having a top which is arranged only on one side of a line "A" parallel with the surface and extending through the center of the hole; or
   wherein the washer is integrated in the inclined surface, and wherein at least one hill is arranged on the surface of the inclined surface the at least one hill having a top which is arranged only on one side of a line "A" parallel with the surface and extending through the center of an opening in the inclined surface.

15. The room divider system according to claim 14, wherein the washer is arranged such that the line "A" is essentially parallel with a bottom wall of the connector and such that the top of the at least one hill is arranged on the side of the washer defined by the line "A" being closest to the bottom wall.

16. The room divider system according to claim 12, further comprising a profile being configured to be arranged covering a top and/or a bottom edge of the panel, said the profile having a flange configured to be attached by the fastener to the connector and to the lath, wherein said the profile comprises at least one opening allowing access to the connection element and to the fastener.

17. The room divider system according to claim 12, wherein the connector comprises an inclined surface being configured to guide the fastener to attach to the at least one lath at an angle (α) being less than 90° in relation a longitudinal extension of the at least one lath.

18. The room divider system according to claim 12, wherein the connector comprises an inclined surface being configured to guide the fastener to attach to the at least one lath at an angle (α) being larger than 45° and up to 75° in relation a longitudinal extension of the at least one lath.

19. The room divider system according to claim 1, wherein the connector is arranged adjacent to a short end of the at least one lath of the panel, wherein a respective connector is arranged adjacent to each of at least two corners of the panel.

20. The room divider system according to claim 1, wherein the associated equipment comprises at least one of an attachment member, an adjustable foot, or a suspension member for assembling the panel as a sliding door.

21. The room divider system according to claim 1, wherein the connector is attached to the second surface of the at least one lath.

22. A room divider system comprising:
   at least one panel having a first sheet and a second sheet spaced apart by at least one lath and forming a cavity between the first sheet and the second sheet;
   wherein the at least one lath comprises a first surface facing outwardly from the at least one panel, and a second surface opposite the first surface and facing the cavity;
   a connector forming a rigid structure for associated equipment, the connector being configured to be at least partially inserted in the cavity formed between the first sheet and the second sheet;
   wherein the connector is arranged to be attached to the at least one lath along the second surface facing the cavity; and wherein the connector is arranged to be attached to the at least one lath by a mechanical fastener penetrating through the connector and into the at least one lath at an angle (α) that is larger than 0° and les than 90° relative to a longitudinal extension of the at least one lath.

* * * * *